US011014553B2

(12) United States Patent
Ozawa et al.

(10) Patent No.: US 11,014,553 B2
(45) Date of Patent: May 25, 2021

(54) CONTROL DEVICE FOR VEHICLE AND CONTROL METHOD OF VEHICLE

(71) Applicant: TOYOTA JIDOSHA KABUSHIKI KAISHA, Toyota (JP)

(72) Inventors: Jun Ozawa, Machida (JP); Minami Sato, Ebina (JP); Shinichi Nagata, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 16/050,721

(22) Filed: Jul. 31, 2018

(65) Prior Publication Data

US 2019/0061743 A1 Feb. 28, 2019

(30) Foreign Application Priority Data

Aug. 31, 2017 (JP) .............................. JP2017-167198

(51) Int. Cl.
*B60W 30/09* (2012.01)
*B60W 30/12* (2020.01)
(Continued)

(52) U.S. Cl.
CPC .......... *B60W 30/09* (2013.01); *B60W 10/184* (2013.01); *B60W 10/20* (2013.01);
(Continued)

(58) Field of Classification Search
CPC ...... G01C 3/00; G01C 21/3602; G05D 13/00; G05D 3/00; G05D 1/0212; G05D 1/00; G05D 1/02; G05D 1/021; G05D 1/0214; G05D 1/0231; G05D 1/0242; G05D 1/0246; G05D 1/0253; G05D 1/0255; G05D 1/0257; G05D 1/0259; G05D 1/027;
(Continued)

(56) References Cited

U.S. PATENT DOCUMENTS

2008/0086269 A1\* 4/2008 Joe ..................... B62D 15/0265
701/301
2011/0187515 A1\* 8/2011 Saito ................. B60W 30/0956
340/425.5
(Continued)

FOREIGN PATENT DOCUMENTS

JP   2015-077936 A   4/2015
JP   2015-155295 A   8/2015

*Primary Examiner* — Anthony R Jimenez
(74) *Attorney, Agent, or Firm* — Sughrue Mion, PLLC

(57) ABSTRACT

A control device includes an electronic control unit configured to expand a first detection range at least in front of a host vehicle during execution of current first steering control, determine whether next first steering control is needed to be implemented and whether a relative direction of a next second object with respect to the host vehicle is the same as a relative direction of a first object with respect to the host vehicle when the second object is detected, and perform relaxation steering control based on a target value smaller in absolute value than a return target value after an end of the current first steering control when the implementation of the next first steering control is determined to be needed and the relative directions with respect to the host vehicle are determined to be the same between the second and the first object.

6 Claims, 14 Drawing Sheets

(51) Int. Cl.
*B60W 30/14* (2006.01)
*B60W 10/184* (2012.01)
*B60W 20/15* (2016.01)
*B60W 10/20* (2006.01)

(52) U.S. Cl.
CPC .......... *B60W 20/15* (2016.01); *B60W 30/12* (2013.01); *B60W 30/143* (2013.01); *B60W 2520/10* (2013.01); *B60W 2554/00* (2020.02); *B60W 2554/4041* (2020.02); *B60W 2710/202* (2013.01)

(58) Field of Classification Search
CPC .......... G05D 1/0289; B60W 2720/00; B60W 2720/10; B60W 2720/12; B60W 2720/125; B60W 30/09; B60W 30/095; B60W 30/12; B60W 30/143; B60W 20/15; B60W 10/184; B60W 10/20; B60W 2554/4041; B60W 2554/00; B60W 2520/10; B60W 2530/20; B60W 2710/202; B60W 40/00; B60W 40/09; B60W 40/10; B60W 2750/00; B60W 2750/30; B60W 2550/00; B60W 2550/10; B60W 2550/14; B60W 2050/0062
USPC ..................... 701/48, 75, 400, 445
See application file for complete search history.

(56) References Cited

U.S. PATENT DOCUMENTS

| | | |
|---|---|---|
| 2015/0210279 A1 | 7/2015 | Agnew et al. |
| 2016/0231130 A1 | 8/2016 | Akiyama |

\* cited by examiner

CONTROL DEVICE FOR VEHICLE AND CONTROL METHOD OF VEHICLE

INCORPORATION BY REFERENCE

The disclosure of Japanese Patent Application No. 2017-167198 filed on Aug. 31, 2017 including the specification, drawings, and abstract is incorporated herein by reference in its entirety.

BACKGROUND

1. Technical Field

The disclosure relates to a control device for a vehicle and a control method of a vehicle.

2. Description of Related Art

Japanese Unexamined Patent Application Publication No. 2015-155295 (JP 2015-155295 A) discloses a vehicle control device that performs a steering control when a vehicle passes a pedestrian. The vehicle control device identifies the pedestrian close to the vehicle using an on-vehicle sensor. The vehicle control device calculates a collision probability with an identified pedestrian and compares the calculated probability with a threshold value. When the collision probability with the pedestrian is higher than the threshold value, the vehicle control device sets a separation distance from the identified pedestrian within a current traveling lane. Steering control is control for adjusting a position of the vehicle in the right and left direction (vehicle width direction) when the vehicle passes the identified pedestrian based on the set separation distance. With the steering control as described above, it is possible for the vehicle to safely pass the identified pedestrian while the vehicle avoids the collision with the identified pedestrian.

SUMMARY

In the steering control described above, an adjustment for returning the position of the vehicle in the right and left direction to the center of the current traveling lane is also performed after the passing of the identified pedestrian ends. After the end of the steering control, the vehicle control device identifies a next pedestrian using the on-vehicle sensor. When a collision probability with the next pedestrian is higher than the threshold value, the vehicle control device sets the separation distance and adjusts the position of the vehicle in the right and left direction when the vehicle passes the next pedestrian. That is, next steering control is performed.

Here, an interval from the end of the previous steering control to the start of the current steering control may be short. In this case, the previous steering control and the current steering control are performed continuously. However, when a relative direction of a pedestrian already passed with respect to the vehicle is the same as a relative direction of the pedestrian to be passed, the position adjustment of the vehicle in the right and left direction in both steering control is performed in the same direction. Therefore, the vehicle moves in a zigzag manner due to the continuous steering control, and the driver may feel uncomfortable.

In another case, the vehicle control device may not be able to identify a next pedestrian even though the driver is aware of the next pedestrian to be passed by the vehicle during execution of the current steering control. The case described above is caused by a fact that a range for identifying the pedestrian in the vehicle control device is always set to be constant. In the case as described above, when the relative direction of the pedestrian with respect to the vehicle during the passing is the same as the relative direction of the next pedestrian with respect to the vehicle, the position return adjustment described above is performed as part of the current steering control. Consequently, the operation of the position return adjustment may cause the driver to feel anxiety that the vehicle approaches the next pedestrian.

The disclosure provides a control device for a vehicle and a control method of a vehicle capable of further reducing a sense of discomfort felt by a driver during execution of steering control in the control device and the control method that perform the steering control when the vehicle passes an obstacle that has a possibility of colliding with the vehicle while the vehicle avoids the collision with the obstacle.

A first aspect of the disclosure relates to a control device for a vehicle. The vehicle includes steered wheels. The control device includes an electronic control unit. The electronic control unit is configured to execute first steering control to avoid a collision with a first object that has a possibility of colliding with a host vehicle. The electronic control unit is configured to execute second steering control following the first steering control. The second steering control is control to steer the steered wheels in a direction opposite to a steering direction of the steered wheels by the first steering control. The electronic control unit is configured to set an avoidance target value and a return target value when the first object is detected in a first detection range. The avoidance target value is a target value of a control amount for steering the steered wheels in the first steering control. The return target value is a target value of a control amount for steering the steered wheels in the second steering control. The electronic control unit is configured to expand the first detection range at least in front of the host vehicle during execution of current first steering control based on the avoidance target value. When a second object is detected in the expanded first detection range during the execution of the current first steering control, the electronic control unit is configured to determine whether a next first steering control to avoid a collision with the second object that has a possibility of colliding with the host vehicle is needed to be implemented and whether a relative direction of the second object with respect to the host vehicle is the same as a relative direction of the first object with respect to the host vehicle. The electronic control unit is configured to perform relaxation steering control based on a target value smaller in absolute value than the return target value instead of current second steering control based on the return target value after an end of the current first steering control when the implementation of the next first steering control is determined to be needed and the relative directions with respect to the host vehicle are determined to be the same between the second object and the first object.

In the control device according to the first aspect of the disclosure, the electronic control unit may be configured to perform the relaxation steering control before next second steering control following the next first steering control is started.

In the control device according to the first aspect of the disclosure, the electronic control unit may be configured to set the first detection range in front of the host vehicle. The electronic control unit may be configured to set a second detection range behind the host vehicle at a position obtained by rotating the first detection range by 180 degrees around a center of the host vehicle during the execution of the first steering control such that the electronic control unit detects a parallel traveling vehicles that travels behind the host vehicle in a lane adjacent to a lane in which the host vehicle travels. The electronic control unit may be configured to determine whether the parallel traveling vehicle approaches the host vehicle during the execution of the relaxation steering control and whether an inter-vehicle distance between the host vehicle and the parallel traveling vehicle is shorter than a determination value when the parallel traveling vehicle is detected in the second detection range during the execution of the current first steering control. The electronic control unit may be configured to perform the current second steering control after the end of the current first steering control when the parallel traveling vehicle is determined to approach the host vehicle during the execution of the relaxation steering control and the inter-vehicle distance between the host vehicle and the parallel traveling vehicle is determined to be shorter than the determination value.

In the control device according to the first aspect of the disclosure, the electronic control unit may be configured to, during the execution of the current first steering control, expand the first detection range in a direction in front of the host vehicle and in a direction opposite to a movement direction of the host vehicle in a right and left direction of the host vehicle in the current first steering control. An expansion width of the first detection range in the right and left direction may be equal to or larger than a movement distance of the host vehicle in the right and left direction in the current first steering control.

In the control device according to the first aspect of the disclosure, the vehicle may include an external sensor, and the electronic control unit may be configured to detect the first object and the second object in the first detection range based on information acquired by the external sensor.

A second aspect of the disclosure relates to a control method of a vehicle. The vehicle includes steered wheels and an electronic control unit. The control method includes: executing, by the electronic control unit, first steering control to avoid a collision with a first object that has a possibility of colliding with a host vehicle; executing, by the electronic control unit, second steering control following the first steering control; setting, by the electronic control unit, an avoidance target value and a return target value when the first object is detected in a first detection range; expanding, by the electronic control unit, the first detection range at least in front of the host vehicle during execution of a current first steering control based on the avoidance target value; when a second object is detected in the expanded first detection range during the execution of the current first steering control, determining, by the electronic control unit, whether a next first steering control to avoid a collision with the second object that has a possibility of colliding with the host vehicle is needed to be implemented and whether a relative direction of the second object with respect to the host vehicle is the same as a relative direction of the first object with respect to the host vehicle; and performing, by the electronic control unit, a relaxation steering control based on a target value smaller in absolute value than the return target value instead of a current second steering control based on the return target value after an end of the current first steering control when the implementation of the next first steering control is determined to be needed and the relative directions with respect to the host vehicle are determined to be the same between the second object and the first object. The second steering control is control to steer the steered wheels in a direction opposite to a steering direction of the steered wheels by the first steering control. The avoidance is a target value of a control amount for steering the steered wheels in the first steering control. The return target value is a target value of a control amount for steering the steered wheels in the second steering control According to the first aspect of the disclosure, since the first detection range is expanded at least in front of the host vehicle during the execution of the current first steering control, an opportunity to detect the second object increases. It is predictable that the next first steering control to cause the host vehicle to avoid in the same direction as the current first steering control may be started as soon as the current second steering control is ended through the determination relating to the next first steering control and the determination relating to the relative direction with respect to the host vehicle. Then, when the prediction as described above is made, the relaxation steering control is performed based on the target value smaller in the absolute value than the return target value after the end of the current first steering control. Accordingly, the steering control in which the driver does not feel uncomfortable or anxiety is realized after the end of the current first steering control.

According to the first aspect of the disclosure, furthermore, the steering control in which the driver does not feel uncomfortable or anxiety is realized before the start of the next second steering control after the end of the current first steering control.

According to the first aspect of the disclosure, furthermore, since a second detection range is set, the parallel traveling vehicle that travels in parallel behind the host vehicle can be detected. The possibility of continuing the steering control is predictable through the determination relating to the approach of the parallel traveling vehicle to the host vehicle during the execution of the relaxation steering control and the determination relating to the inter-vehicle distance between the host vehicle and the parallel traveling vehicle. Then, when the prediction as described above is made, the current second steering control is exceptionally performed based on the return target value after the end of the current first steering control. Accordingly, it is possible to restrain the driver from feeling anxiety due to the continuity of the relaxation steering control.

According to the first aspect of the disclosure, furthermore, the first detection range during the execution of the first steering control is expanded in front of the host vehicle and in the right and left direction thereof. The expansion width in the right and left direction is equal to or larger than the movement distance of the host vehicle in the right and left direction in the current first steering control. Therefore, an opportunity to recognize the second object in the same direction as the relative direction of the first object with respect to the host vehicle increases.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
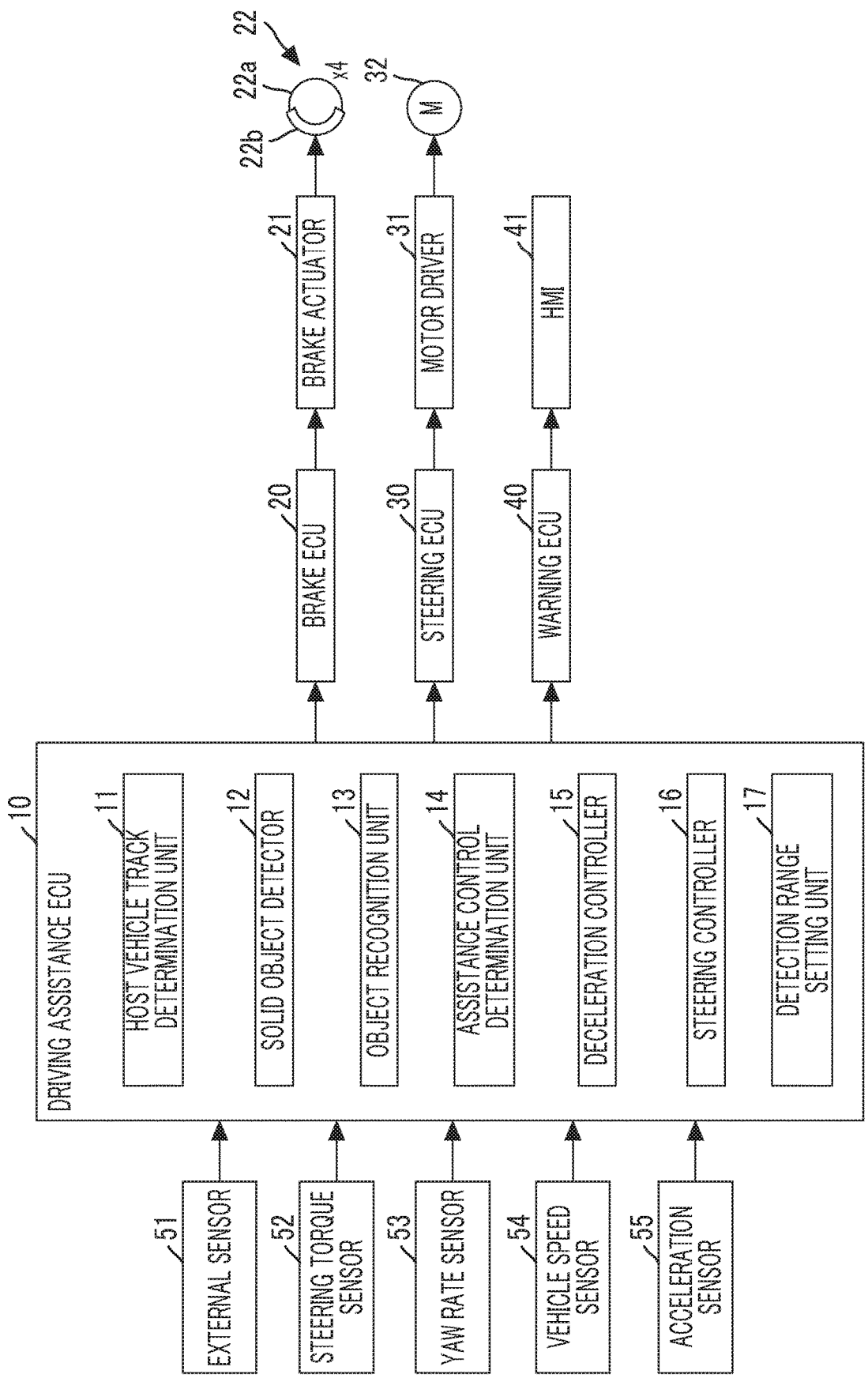
FIG. 1 is a block diagram for describing a configuration of a control device according to Embodiment 1 of the disclosure.

Hereinafter, embodiments of the disclosure will be described based on drawings. The same reference numeral is assigned to a common element in each drawing, and redundant description is omitted. The disclosure is not limited to the following embodiments.

First, Embodiment 1 of the disclosure will be described with reference to FIGS. 1 to 12.

Configuration of Control Device

FIG. 1 is a block diagram for describing a configuration of a control device according to Embodiment 1. The control device according to Embodiment 1 includes a driving assistance ECU 10, a brake ECU 20, a steering ECU 30, and a warning ECU 40. Each ECU includes a microcomputer as a main part and is connected so as to be transmittable and receivable mutually through a controller area network (CAN) (not illustrated). The ECU stands for an electronic control unit. In the specification, the microcomputer includes a central processing unit (CPU) and a storage device such as a read only memory (ROM) and a random access memory (RAM), and the CPU executes an instruction (program) stored in the ROM to realize various functions. In the specification, a vehicle on which the control device is mounted is also referred to as "host vehicle".

The driving assistance ECU 10 is connected to an external sensor 51, a steering torque sensor 52, a yaw rate sensor 53, a vehicle speed sensor 54, and an acceleration sensor 55. The steering torque sensor 52, the yaw rate sensor 53, the vehicle speed sensor 54, and the acceleration sensor 55 are classified as internal sensors.

The external sensor 51 has a function of acquiring information relating to at least a road in front of the host vehicle and a solid object present around the road. The solid object represents, for example, a moving object such as a pedestrian, a bicycle, and a vehicle, and a fixed object such as a utility pole, a tree, and a guardrail.

The external sensor 51 includes, for example, a radar sensor and a camera sensor. The radar sensor radiates, for example, a radio wave in a millimeter wave band (hereinafter, referred to as "millimeter wave") to the surroundings (including at least the front side) of the host vehicle. When a solid object reflecting the millimeter wave is present in a radiation range, the radar sensor calculates presence or absence of the solid object and a relative relationship (distance between the host vehicle and the solid object, relative speed of the host vehicle with respect to the solid object, and the like) between the host vehicle and the solid object by the reflected wave from the solid object. The camera sensor includes, for example, a stereo camera. The camera sensor images right and left scenes in front of the vehicle and calculates the shape of a road, the presence or absence of the solid object, the relative relationship between the host vehicle and the solid object, and the like based on the imaged right and left image data. The camera sensor recognizes a lane marker (hereinafter, referred to as "white line") such as an outside line of a roadway, a center line of the roadway, and a boundary line between a traveling lane and a passing lane to calculate the shape of the road and a positional relationship between the road and the host vehicle.

Information acquired by the external sensor 51 is also referred to as "target information". The external sensor 51 repeatedly transmits the target information to the driving assistance ECU 10 at a predetermined period. The external sensor 51 may not include the radar sensor and the camera sensor and may include, for example, only the camera sensor. Information of a navigation system can be used for information on the shape of the road on which the host vehicle travels and information representing the positional relationship between the road and the host vehicle.

The steering torque sensor 52 detects steering torque that a driver inputs to steered wheels and transmits a detection signal of the steering torque to the driving assistance ECU 10. The yaw rate sensor 53 detects a yaw rate applied to the host vehicle and transmits a detection signal of the yaw rate to the driving assistance ECU 10. The vehicle speed sensor 54 detects a traveling speed of the host vehicle (hereinafter, referred to as "vehicle speed") and transmits a detection signal of the traveling speed to the driving assistance ECU 10. The acceleration sensor 55 detects front-rear acceleration which is acceleration applied in the front-rear direction of the host vehicle and lateral acceleration which is acceleration applied in the right and left direction (vehicle width direction) of the host vehicle, and transmits a detection signal of the lateral acceleration to the driving assistance ECU 10. The vehicle speed sensor 54 may be a tire-wheel assembly speed sensor.

The brake ECU 20 is connected to a brake actuator 21. The brake actuator 21 is provided in a hydraulic circuit between a master cylinder (not illustrated) that pressurizes hydraulic oil by stepping force on a brake pedal and friction brake mechanisms 22 provided on right, left, front, and rear tire-wheel assemblies. The friction brake mechanism 22 includes a brake disc 22a fixed to the tire-wheel assembly and a brake caliper 22b fixed to a vehicle body. The friction brake mechanism 22 operates a wheel cylinder embedded in the brake caliper 22b by hydraulic pressure of the hydraulic oil supplied from the brake actuator 21 to press a brake pad against the brake disc 22a and generates friction braking force.

The steering ECU 30 is a control device of an electric power steering system and is connected to a motor driver 31. The motor driver 31 is connected to a steering motor 32. The steering motor 32 is incorporated in a steering mechanism (not illustrated), a rotor of the motor is rotated by electric power supplied from the motor driver 31, and right and left steering tire-wheel assemblies are steered by the rotation of the rotor. In a normal time, the steering ECU 30 causes the steering motor 32 to generate steering assist torque corresponding to steering torque of the driver detected by the steering torque sensor 52. A direction of the steering torque is identified by a sign (positive or negative) of the steering torque. For example, the steering torque acting in the right direction is represented as positive steering torque, and the steering torque acting in the left direction is represented as negative steering torque. When a steering control command value (steering torque command value described below) transmitted from the driving assistance ECU 10 is received when the driver does not operate a steering wheel, the steering motor 32 is driven and controlled according to the steering control command value to steer the steering tire-wheel assemblies.

The warning ECU 40 is connected to a human machine interface (HMI) 41. The HMI 41 is sound output means such as a buzzer and a speaker, and display means such as a head up display (HUD), a display of the navigation system, and combination meter. The warning ECU 40 outputs a warning sound from the sound output means according to an alert command from the driving assistance ECU 10 or displays a warning message, a warning lamp, and the like on the display means to notify the driver of an operation situation of assistance control.

Configuration of Driving Assistance ECU

The driving assistance ECU 10 will be described. The driving assistance ECU 10 includes a host vehicle track determination unit 11, a solid object detector 12, an object recognition unit (hereinafter, referred to as object recognition unit) 13 that determines an object with a possibility of a collision, an assistance control determination unit 14, a deceleration controller 15, a steering controller 16, and a detection range setting unit 17.

The host vehicle track determination unit 11 generates information relating to the road on which the host vehicle travels at a predetermined calculation cycle based on the target information transmitted from the external sensor 51. With a front end center position of the host vehicle as an origin point, the host vehicle track determination unit 11 generates, for example, coordinate information (position information) on the ground, the solid object, and the white line using a coordinate system expanding in the right and left direction, and the front side from the origin point. As described above, the host vehicle track determination unit 11 grasps a shape of the traveling lane of the host vehicle defined by right and left white lines, a position and an orientation of the host vehicle within the traveling lane, and a relative position of the solid object with respect to the host vehicle. The host vehicle track determination unit 11 calculates a turning radius of the host vehicle based on the yaw rate detected by the yaw rate sensor 53 and the vehicle speed detected by the vehicle speed sensor 54, and calculates a trajectory of the host vehicle based on the turning radius.

The solid object detector 12 discriminates whether the solid object is the moving object or a stationary object based on a change in a position of the solid object present in a detection range set by the detection range setting unit 17. When the solid object is discriminated as the moving object, the solid object detector 12 calculates a trajectory of the solid object. For example, a movement speed of the solid object in the front-rear direction (traveling direction of the host vehicle) can be calculated from a relationship between the vehicle speed and the relative speed with respect to the solid object. A movement speed of the solid object in the right and left direction can be calculated from a change amount of a distance between a lateral end position of the solid object and the white line detected by the external sensor 51 and the like. The solid object detector 12 calculates the trajectory of the solid object based on the movement speeds of the solid object in the front-rear direction, and the right and left direction. The solid object detector 12 may calculate the trajectory of the solid object based on the calculated trajectory of the host vehicle and the distance between the host vehicle and the solid object detected by the external sensor 51.

The object recognition unit 13 performs determination relating to the possibility (hereinafter, referred to as "collision possibility") of the collision of the host vehicle with the solid object of when the host vehicle travels with maintaining a current traveling state based on the position of the solid object and the trajectory of the host vehicle. When the solid object is the moving object, the object recognition unit 13 calculates the trajectory of the solid object and performs the determination relating to the collision possibility based on the trajectory of the solid object and the trajectory of the host vehicle. The object recognition unit 13 calculates a time to collision TTC which is a prediction time before the host vehicle collides with the solid object (remaining time before collision) by the following equation (1) based on a distance $L_1$ between the solid object and the host vehicle and a relative speed $Vr_1$ with the solid object.

$$TTC = L_1/Vr_1 \quad (1)$$

When the time to collision TTC is equal to or less than a collision determination value $TTC_1$ set in advance, the object recognition unit 13 determines that the collision possibility is high. When the time to collision TTC is longer than a collision determination value $TTC_2$ ($>TTC_1$) set in advance, the object recognition unit 13 determines that there is no collision possibility. When the time to collision TTC is between the collision determination value $TTC_1$ and the collision determination value $TTC_2$, the object recognition unit 13 determines that the collision possibility is low. When the collision possibility is determined to be high and the collision possibility is determined to be low, the object recognition unit 13 recognizes the solid object as the object. That is, when the time to collision TTC is equal to or less than the collision determination value $TTC_2$, the object recognition unit 13 recognizes the solid object as the object.

The assistance control determination unit 14 determines the presence or absence of the recognition of the object by the object recognition unit 13. When the object is recognized, the assistance control determination unit 14 selects the assistance control for avoiding the collision with the object and sets a start timing and an end timing of the selected assistance control. The assistance control includes deceleration control for decelerating the host vehicle by intervening in the driving operation of the driver and steering control for controlling the steering torque of the host vehicle by intervening in the driving operation of the driver.

The selection of the assistance control can be performed, for example, based on a level of the collision possibility. Specifically, when the collision possibility is high, the assistance control determination unit 14 selects the deceleration control as the assistance control. When the collision possibility is low, the assistance control determination unit 14 selects the steering control as the assistance control. The assistance control determination unit 14 can also select a combination of the deceleration control and the steering control as the assistance control regardless of the level of the collision possibility. A method of setting the start timing and the end timing of the selected assistance control will be described below.

When the start timing and the end timing of the deceleration control are set, the deceleration controller 15 calculates a target deceleration for decelerating the host vehicle. For example, a case where the object is stopped is taken as an example. When a vehicle speed (=relative speed) at a current timing is V, a deceleration of the host vehicle is a, and a time until the host vehicle stops is t, a traveling distance X until the host vehicle stops can be represented by the following equation (2).

$$X = V \cdot t + (1/2) \cdot a \cdot t^2 \quad (2)$$

The time t until the host vehicle stops can be represented by the following equation (3).

$$t = -V/a \quad (3)$$

Accordingly, the deceleration a which is needed to stop the host vehicle at a traveling distance TD can be represented by the following equation (4) by substituting equation (3) into equation (2).

$$a = -V^2/2TD \quad (4)$$

In order to stop the host vehicle at a distance β before the object, the traveling distance TD may be set to a distance $(L_1-\beta)$ which is obtained by subtracting the distance β from the distance $L_1$ detected by the external sensor 51. When the object is moved, the deceleration a may be calculated using the relative speed with respect to the object.

The deceleration controller 15 sets the deceleration a calculated as described above to the target deceleration. However, the deceleration that can be generated in the host vehicle has a limit (for example, about −1 G). Therefore, when an absolute value of the calculated target deceleration is larger than an absolute value of an upper limit value amax, the deceleration controller 15 sets the target deceleration to the upper limit value amax. The deceleration controller 15 transmits a braking command representing the target deceleration to the brake ECU 20. As described above, the brake ECU 20 controls the brake actuator 21 according to the target deceleration to generate the friction braking force in the tire-wheel assemblies. As described above, an automatic brake is operated and the host vehicle decelerates.

Figure 2:
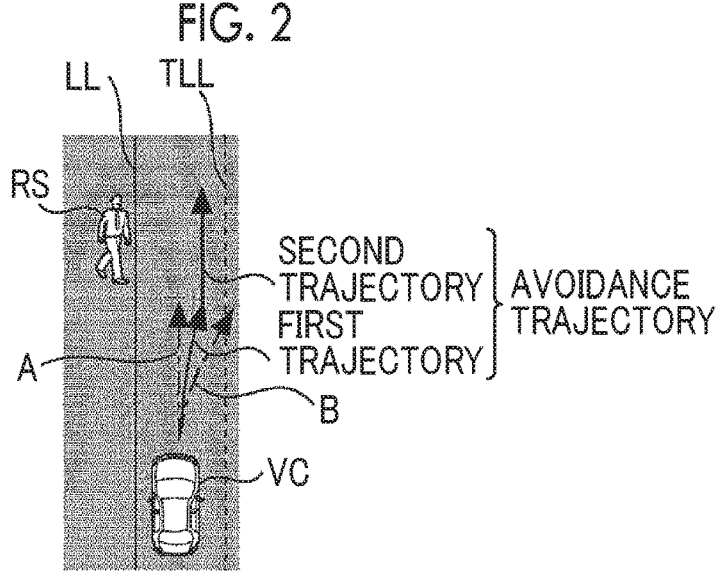
FIG. 2 is a diagram for describing a method of specifying an avoidance trajectory.

When the start timing and the end timing of the steering control are set, the steering controller 16 calculates and specifies the avoidance trajectory in which the host vehicle may take to avoid the collision with the object at a predetermined calculation cycle. FIG. 2 is a diagram for describing a method of specifying the avoidance trajectory. For example, when the host vehicle is assumed to travel within a current traveling lane with maintaining the current traveling state, the steering controller 16 specifies a route A through which the host vehicle is predicted to travel. When the host vehicle adds the maximum change in lateral acceleration for the host vehicle to turn safely within the current traveling lane to current lateral acceleration, the steering controller 16 specifies a route B through which the host vehicle is predicted to travel.

The steering controller 16 obtains a route candidate when the lateral acceleration is changed by a constant amount in a traveling range from the route A to the route B. The steering controller 16 obtains a first trajectory that can safely avoid the collision with an object RS by turning of a host vehicle VC and where the lateral acceleration becomes the smallest based on a degree of interference between the route candidate and the object. The steering controller 16 obtains a second trajectory where the host vehicle VC can travel by the side of the object RS while a distance between the host vehicle VC and a boundary line TLL is maintained constantly. Then, the steering controller 16 calculates and specifies a trajectory connecting the first trajectory and the second trajectory as the avoidance trajectory.

The steering controller 16 specifies a return trajectory after the host vehicle avoids the collision with the object at a predetermined calculation cycle. The return trajectory is a trajectory for returning the position of the host vehicle in the right and left direction to the center of the current traveling lane (hereinafter, referred to as "return trajectory"). A first end of the return trajectory is positioned on an extension line of the avoidance trajectory, and a second end of the return trajectory is positioned at the center of the current traveling lane. The calculation and specification of the return trajectory are performed in parallel with the calculation and specification of the avoidance trajectory. The steering controller 16 obtains and specifies the trajectory for returning the host vehicle traveling along the avoidance trajectory to the center of the current traveling lane with predetermined lateral acceleration as the return trajectory.

The steering controller 16 calculates a target yaw rate for causing the host vehicle to travel along the avoidance trajectory and the return trajectory specified as described above. The steering controller 16 calculates target steering torque that can obtain the target yaw rate based on the target yaw rate. The steering controller 16 stores in advance a map (not illustrated) in which the target steering torque that increases as a variation between the yaw rate detected by the yaw rate sensor 53 and the target yaw rate increases is set and calculates the target steering torque with reference to the map. The calculation described above is performed at a predetermined calculation cycle.

When the target steering torque is calculated, the steering controller 16 calculates target steering assist torque obtained by subtracting a current steering torque of the driver from the target steering torque. The steering controller 16 calculates a steering torque command value that increases toward the calculated target steering assist torque and transmits the calculated steering torque command value to the steering ECU 30. However, the steering torque is restricted. Therefore, when the calculated target steering assist torque (positive target steering assist torque) is larger than an upper limit value Trmax, the steering controller 16 sets the target steering assist torque to the upper limit value Trmax. When the calculated target steering assist torque (negative target steering assist torque) is smaller than a lower limit value Trmin, the steering controller 16 sets the target steering assist torque to the lower limit value Trmin. The steering ECU 30 controls a switching element of the motor driver 31 to control energization to the steering motor 32 such that the steering motor 32 generates steering torque having the magnitude of the steering torque command value according to the steering torque command value. As described above, the steering tire-wheel assemblies are autonomously steered, and the host vehicle travels along the avoidance trajectory and the return trajectory.

Hereinafter, for convenience of description, the steering control based on the avoidance trajectory is referred to as "avoidance steering control" and the steering control based on the return trajectory is referred to as "return steering control". The avoidance steering control is an example of a first steering control. The return steering control is an example of a second steering control.

The assistance control determination unit 14 transmits the alert command to the warning ECU 40 at a stage before the automatic brake is operated or before the steering tire-wheel assemblies are autonomously steered. As described above, the warning ECU 40 rings the sound output means or displays a warning message, a warning lamp, and the like on the display means to inform the driver of the operation situation of the assistance control.

The detection range setting unit 17 sets the detection range to detect the object. The detection range is defined by a longitudinal width and a lateral width in front of the host vehicle along the current traveling lane. The longitudinal width is set to, for example, a value $\alpha \cdot V$ obtained by multiplying the vehicle speed V at the current timing by a coefficient $\alpha$. The lateral width is set to, for example, a value $W \cdot \gamma$ obtained by multiplying the vehicle width W of the host vehicle by a coefficient $\gamma$. The coefficients $\alpha$ and $\gamma$ are set in advance according to a degree of safety needed for the host vehicle. The coefficient $\alpha$ is larger than the collision determination value $TTC_2$, and the coefficient $\gamma$ is larger than one. The longitudinal width and the lateral width can be set to fixed values.

Details of Assistance Control Determination Unit

Figure 3:
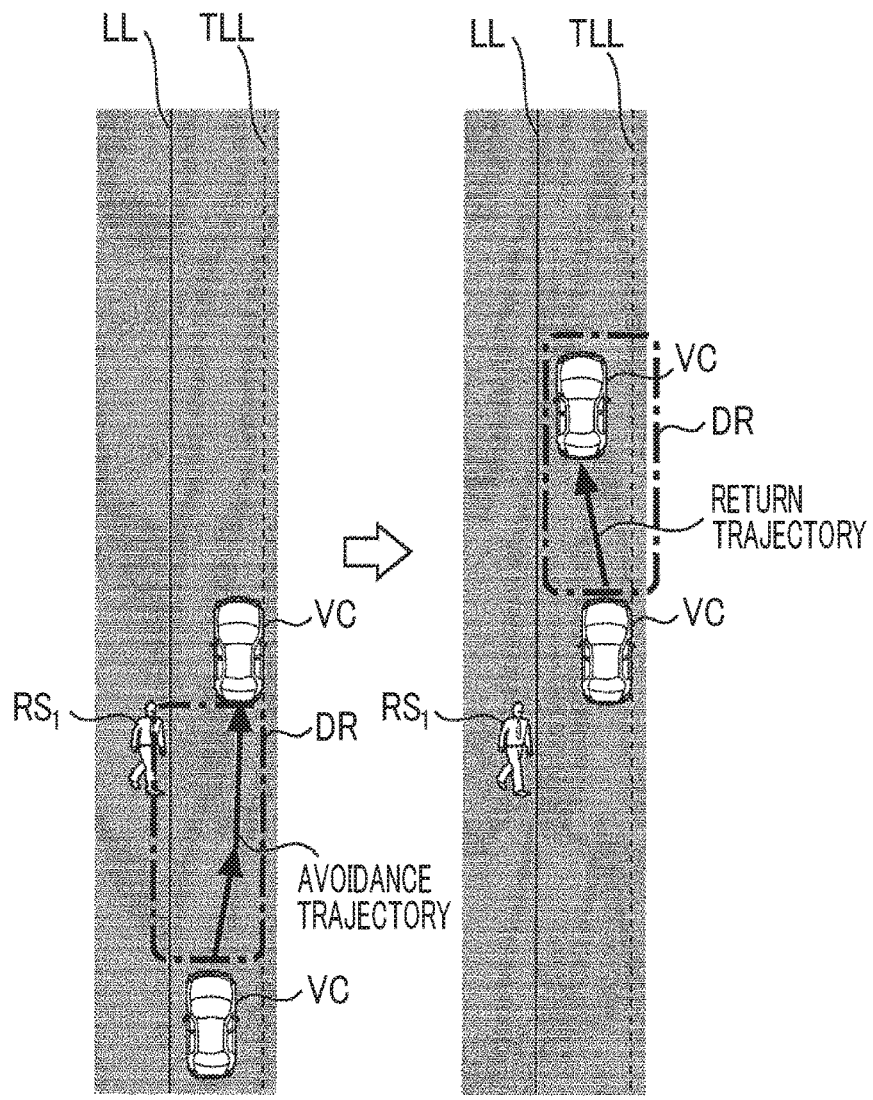
FIG. 3 is a diagram for describing an operation example of a host vehicle when steering control is selected as assistance control.

Details of the assistance control determination unit 14 will be described. As described already, when the object is recognized, the assistance control determination unit 14 selects at least one of the deceleration control or the steering control as the assistance control. FIG. 3 is a diagram for describing an operation example of the host vehicle when the steering control is selected as the assistance control. In the example illustrated in FIG. 3, a first object $RS_1$ is recognized in a detection range DR. A position of the first object $RS_1$ is outside a left white line LL, and a relative direction of the first object $RS_1$ with respect to the host vehicle VC is the left direction. In the example illustrated in FIG. 3, it is assumed that a possibility of the collision of the host vehicle VC with the first object $RS_1$ is determined to be low. At least the steering control is assumed to be selected as the assistance control so as to cause the host vehicle VC to pass the first object $RS_1$ instead of stopping the host vehicle VC before the first object $RS_1$.

Here, when the start timing of the avoidance steering control is too early, the autonomous steering interferes with a steering wheel operation of the driver. For example, there is a case where the autonomous steering is started ahead of the steering wheel operation despite a situation where the driver is aware of presence of the first object $RS_1$ and attempts to operate the steering wheel when the first object $RS_1$ and the host vehicle VC come close to each other. In the case described above, the driver may feel a sense of discomfort. In order to avoid the problem as described above, the assistance control determination unit 14 sets a timing when the host vehicle VC is predicted to be close to the first object $RS_1$ to the start timing of the avoidance steering control. When the steering control is in combination with the deceleration control, the assistance control determination unit 14 sets the start timing of the deceleration control to the same timing as the start timing of the avoidance steering control.

The assistance control determination unit 14 sets a timing when the host vehicle VC is predicted to completely pass the first object $RS_1$ to the end timing of the avoidance steering control. The timing when the host vehicle VC is predicted to completely pass the first object $RS_1$ is calculated by adding an execution period TA of the avoidance steering control to the start timing of the avoidance steering control. The execution period TA can be represented by the following equation (5) using a distance $L_2$ between the first object $RS_1$ and the host vehicle VC, a longitudinal width $WRS_1$ of the first object $RS_1$, and a relative speed $Vr_2$ with the first object $RS_1$ at the start timing of the avoidance steering control.

$$TA=(L_2+WRS_1)/Vr_2 \qquad (5)$$

The end timing of the avoidance steering control normally coincides with the start timing of the return steering control. The end timing of the avoidance steering control normally coincides with a switching timing from the avoidance steering control to the return steering control. When the steering control is in combination with the deceleration control, the end timing of the avoidance steering control coincides with the end timing of the deceleration control.

Switching Timing from Avoidance Steering Control to Return Steering Control

The discrimination of the solid object by the solid object detector 12 and the determination relating to the collision possibility by the object recognition unit 13 are performed at a predetermined calculation cycle. Therefore, a second object is newly recognized during a period from the start timing to the end timing of the avoidance steering control, the assistance control determination unit 14 selects next assistance control for avoiding the collision with the second object. That is, when the second object is not recognized during the execution of the avoidance steering control, the avoidance steering control is switched to the return steering control at the end timing of the avoidance steering control.

Figure 4:
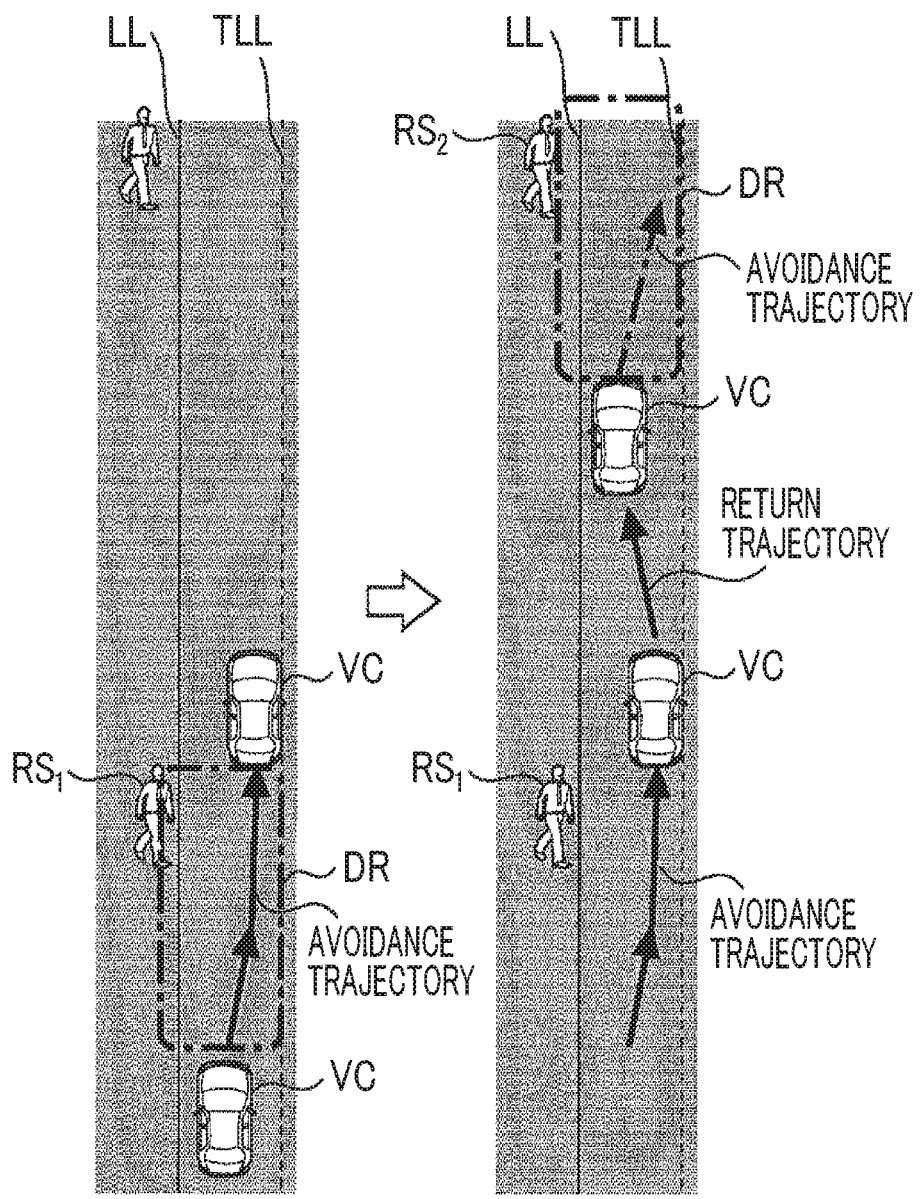
FIG. 4 is a diagram for describing an operation example of the host vehicle when a next second object is recognized after an end of a return steering control.

When the second object is recognized during a period from the start timing to the end timing of the return steering control or after an end of the return steering control, the assistance control determination unit 14 selects the next assistance control. FIG. 4 is a diagram for describing an operation example of the host vehicle when the second object is recognized after the end of the return steering control. In the example illustrated in FIG. 4, the steering control is already implemented as the assistance control for avoiding the collision with the first object $RS_1$. In the example illustrated in FIG. 4, a second object $RS_2$ is recognized in the detection range DR after the end of the steering control. A position of the second object $RS_2$ is outside the left white line LL, and a relative direction of the second object $RS_2$ with respect to the host vehicle VC is the same left direction as the relative direction of the first object $RS_1$.

In the example illustrated in FIG. 4, it is assumed that a possibility of the collision of the host vehicle VC with the second object $RS_2$ is determined to be low. At least the steering control is assumed to be selected as the assistance control so as to cause the host vehicle VC to pass the second object $RS_2$ instead of stopping the host vehicle VC before the second object $RS_2$. Consequently, next steering control is started as soon as current steering control is ended. That is, next avoidance steering control to cause the host vehicle VC to avoid in the same direction (right direction) as current avoidance steering control is started immediately after the end of current return steering control. Therefore, the host vehicle VC moves in a zigzag manner.

The second object $RS_2$ recognized after the end of the current return steering control is not naturally recognized before an end of the current avoidance steering control. Accordingly, when the driver is already aware of the presence of the second object $RS_2$ before the end of the current avoidance steering control, the autonomous steering by the current return steering control causes the driver to feel anxiety that the host vehicle VC approaches the second object $RS_2$.

Feature of Steering Control According to Embodiment 1

Figure 5:
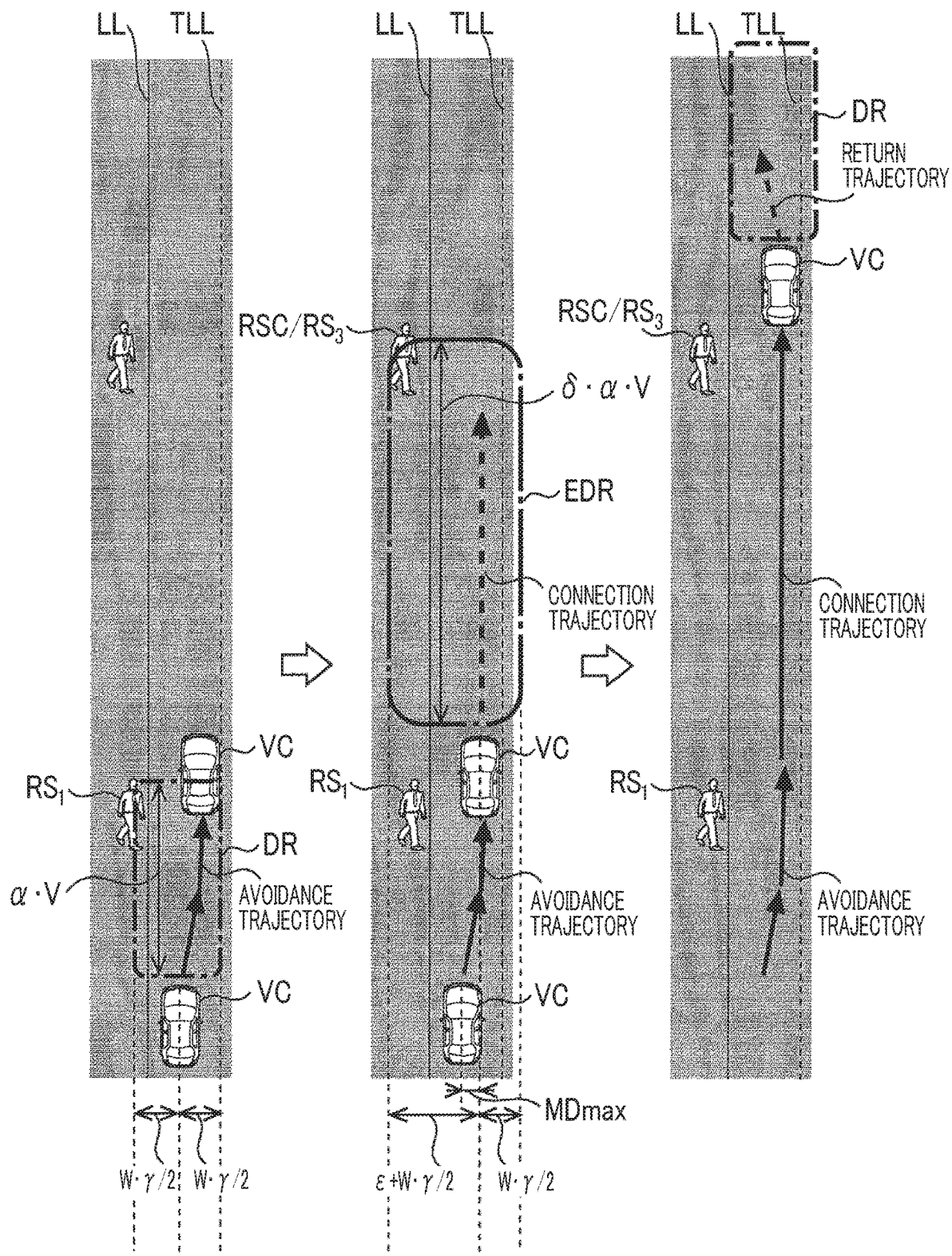
FIG. 5 is a diagram for describing an example of the steering control according to Embodiment 1 of the disclosure.

In Embodiment 1, the detection range set by the detection range setting unit 17 is expanded during the period from the start timing to the end timing of the avoidance steering control. FIG. 5 is a diagram for describing an example of the steering control according to Embodiment 1. In the example illustrated in FIG. 5, the detection range DR is expanded in front of the host vehicle VC and in the left direction thereof along the current traveling lane. The longitudinal width of a detection range EDR after the expansion is set to, for example, a value $\delta \cdot \alpha \cdot V$ obtained by multiplying the value $\alpha \cdot V$ of the longitudinal width before the expansion by a coefficient $\delta$. The lateral width of the detection range EDR is set to, for example, a value $W \cdot \gamma \cdot \varepsilon$ obtained by adding an expansion width c in the left direction to the value $W \cdot \gamma$ of the lateral width before the expansion. The coefficient $\delta$ is larger than one, and the expansion width c is equal to or larger than a maximum movement distance MDmax of the host vehicle VC. The maximum movement distance MDmax is the maximum value of a movement distance of the host vehicle VC in the right direction (avoidance direction) by the avoidance steering control.

In the example illustrated in FIG. 5, a candidate RSC of the second object is detected in the detection range EDR. Therefore, the driving assistance ECU 10 performs the same processing as the processing when the first object $RS_1$ is recognized with respect to the candidate RSC. However, the processing with respect to the candidate RSC is performed with scheduled positions of the candidate RSC and the host vehicle VC at an end timing of the steering control (that is, end timing of return steering control) and a relative speed with the candidate RSC at the end timing as the reference when the steering control for avoiding the collision with the first object $RS_1$ is performed as scheduled, instead of positions of the candidate RSC and the host vehicle VC at a timing of detecting the candidate RSC.

Specifically, the object recognition unit 13 predictively performs determination relating to a possibility of the collision of the host vehicle VC with the candidate RSC after the steering control for avoiding the collision with the first object $RS_1$ is ended. First, the object recognition unit 13 calculates the time to collision TTC before the host vehicle VC collides with the candidate RSC using the above equation (1). However, the distance $L_1$ of equation (1) is replaced with a distance between the candidate RSC and the host vehicle VC at the end timing of the steering control. The relative speed $Vr_1$ of equation (1) is replaced with a relative speed with the candidate RSC at the end timing of the steering control. The object recognition unit 13 discriminates whether the candidate RSC corresponds to the second object by comparing the collision determination values $TTC_1$, $TTC_2$ with the calculated time to collision TTC.

In the example illustrated in FIG. 5, the candidate RSC is assumed to be recognized as a second object $RS_3$. In the case, the assistance control determination unit 14 selects the assistance control and sets the start timing and the end timing of the selected assistance control in the same manner as when the first object $RS_1$ is recognized. A position of the second object $RS_3$ is outside the left white line LL, and a relative direction of the second object $RS_3$ with respect to the host vehicle VC is the same direction (left direction) as the relative direction of the first object $RS_1$. In the example illustrated in FIG. 5, it is assumed that a possibility of the collision of the host vehicle VC with the second object $RS_3$ is determined to be low after the end of the steering control for avoiding the collision with the first object $RS_1$. At least the steering control is assumed to be selected as the assistance control so as to cause the host vehicle VC to pass the second object $RS_3$ instead of stopping the host vehicle VC before the second object $RS_3$.

As described above, when the steering control is selected as the assistance control, the next avoidance steering control to cause the host vehicle VC to avoid in the same direction as the current avoidance steering control is started as soon as the current return steering control is ended. The assistance control determination unit 14 cancels the start timing of the current return steering control. The assistance control determination unit 14 cancels the start timing of the next avoidance steering control. That is, the end timing of the current avoidance steering control and the end timing of the next avoidance steering control are valid. When the current steering control or the next steering control is in combination with the deceleration control, the assistance control determination unit 14 does not cancel the end timing of the deceleration control and cancels the start timing of the current return steering control. That is, the end timing of the deceleration control in combination with the current steering control or the next steering control, the end timing of the current avoidance steering control, and the end timing of the next avoidance steering control are valid.

When the start timing of the current return steering control is canceled, the steering controller 16 specifies the shortest trajectory connecting the avoidance trajectory in the current steering control to the return trajectory in the next steering control as a connection trajectory. The steering controller 16 calculates a target yaw rate for causing the host vehicle VC to travel along the connection trajectory specified as described above and the return trajectory in the next steering control. The steering controller 16 calculates target steering torque that can obtain the target yaw rate based on the target yaw rate. An absolute value of the calculated target steering torque is smaller than an absolute value of the target steering torque in the already canceled current return steering control. When the target steering torque is calculated, the steering controller 16 calculates target steering assist torque obtained by subtracting a current steering torque of the driver from the target steering torque. The steering controller 16 calculates a steering torque command value that increases toward the calculated target steering assist torque and transmits the calculated steering torque command value to the steering ECU 30.

Specific Processing in Embodiment 1

Figure 6:
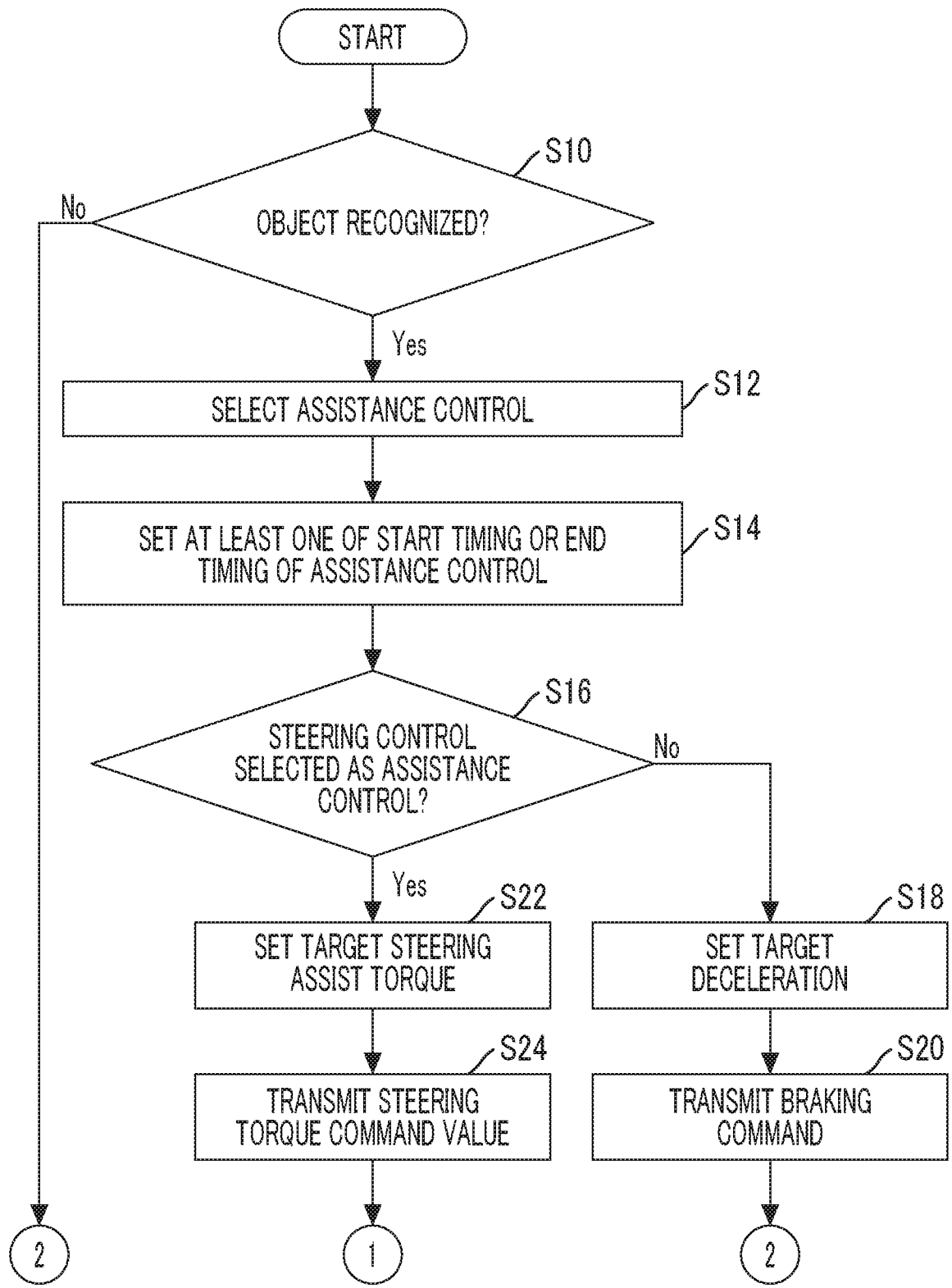
FIG. 6 is a flowchart for describing an example of an assistance control processing routine implemented by a driving assistance ECU in Embodiment 1 of the disclosure.
Figure 7:
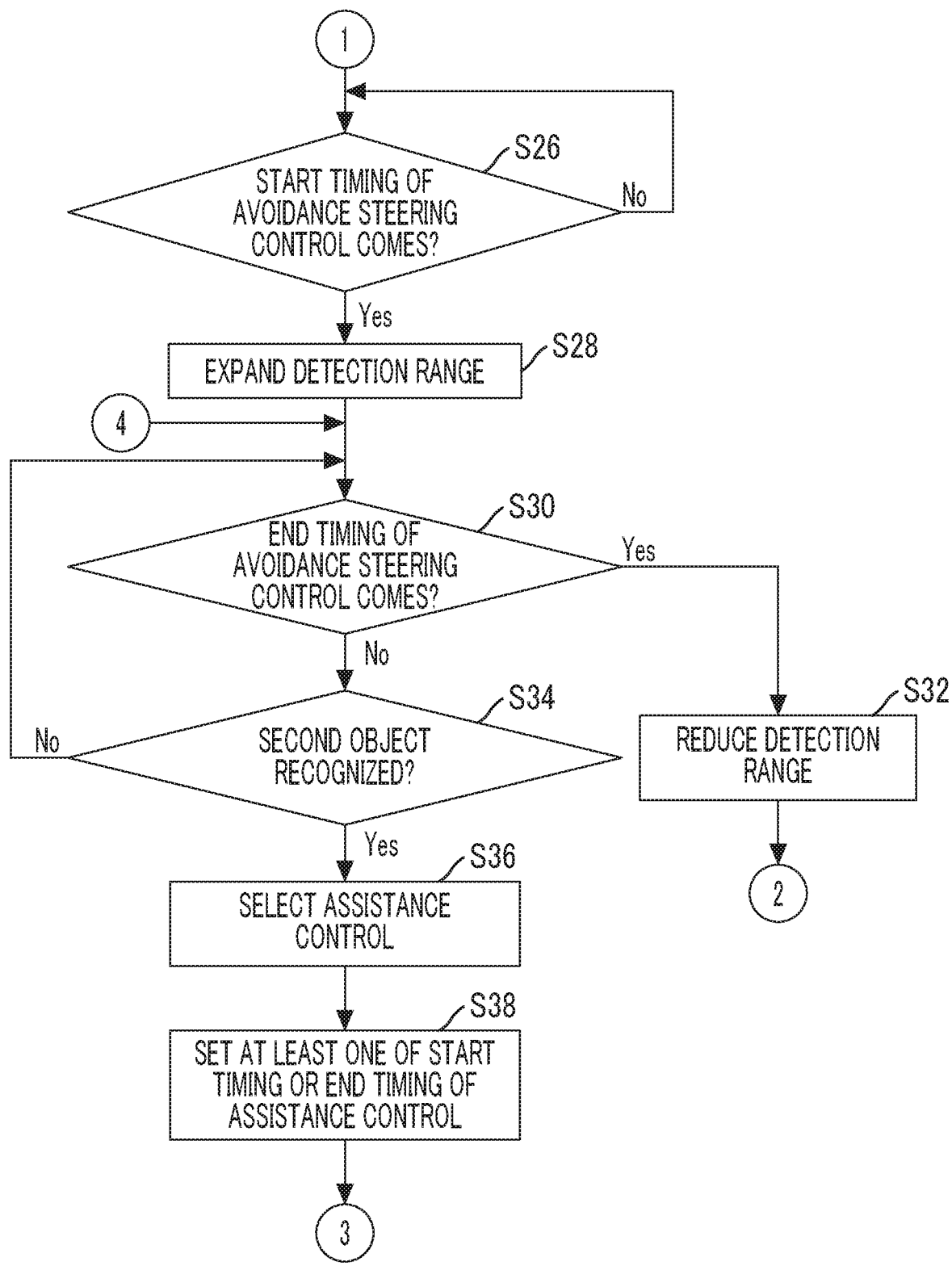
FIG. 7 is a flowchart for describing an example of the assistance control processing routine implemented by the driving assistance ECU in Embodiment 1 of the disclosure.
Figure 8:
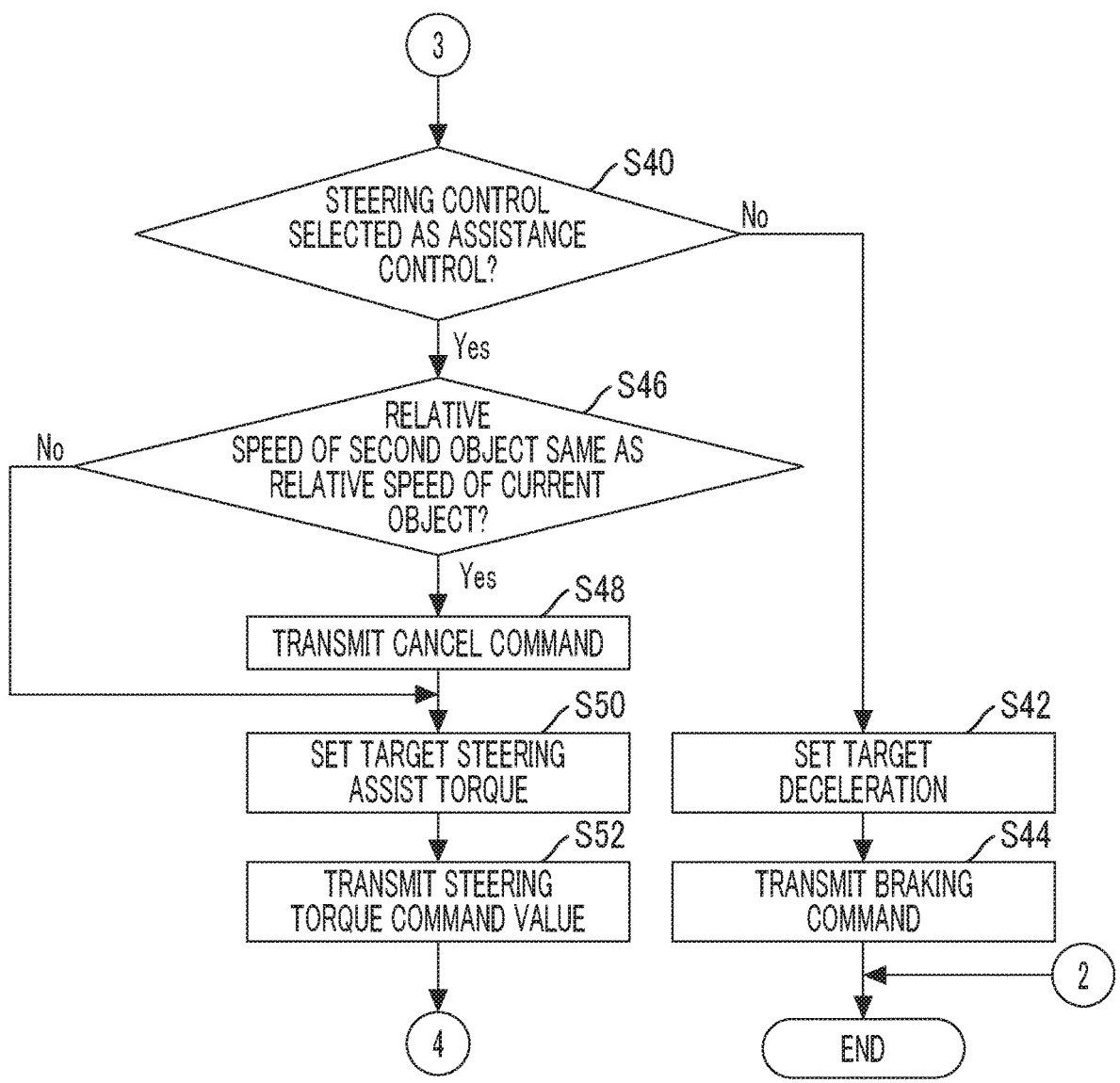
FIG. 8 is a flowchart for describing an example of the assistance control processing routine implemented by the driving assistance ECU in Embodiment 1 of the disclosure.
Figure 9:
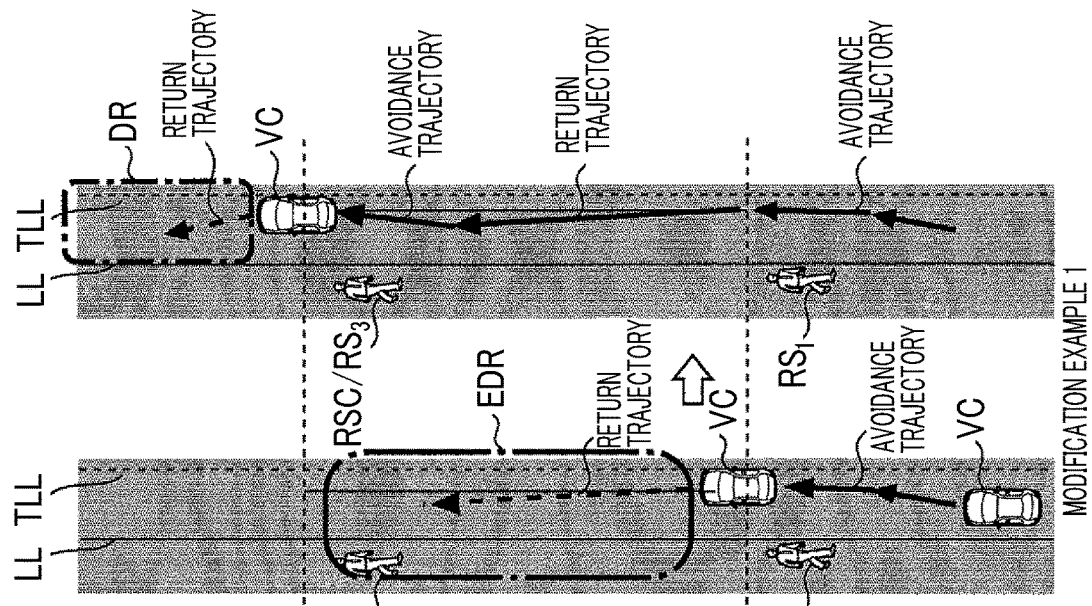
FIGS. 9(a)-(d) are diagrams for describing an example of steering control according to a modification example 1 of Embodiment 1 of the disclosure.

FIGS. 6 to 8 are flowcharts for describing examples of the assistance control processing routines implemented by the driving assistance ECU 10 in Embodiment 1. The processing routines are repeatedly implemented at a predetermined calculation cycle during a period while an ignition switch is on.

When the processing routines illustrated in FIGS. 6 to 8 are activated, the driving assistance ECU 10 first determines whether the object is recognized (step S10). The recognition processing of the object is as described in the description of the object recognition unit 13. When the driving assistance ECU 10 determines that the object is not recognized, the driving assistance ECU 10 exits the processing routine.

In step S10, when the driving assistance ECU 10 determines that the object is recognized, the driving assistance ECU 10 selects the assistance control (step S12) and sets at least one of the start timing or the end timing of the selected assistance control (step S14). The selection processing of the assistance control and the setting processing such as the start timing of the selected assistance control are as described in the description of the assistance control determination unit 14.

Following step S14, the driving assistance ECU 10 determines whether the steering control is selected as the assistance control (step S16). When the driving assistance ECU 10 determines that the steering control is not selected as the assistance control, that is, the deceleration control is selected, the driving assistance ECU 10 sets the target deceleration (step S18). The setting processing of the target deceleration is as described in the description of the deceleration controller 15. Then, the driving assistance ECU 10 transmits the braking command to the brake ECU 20 such that the deceleration control starts from the start timing set in step S14 (step S20).

In step S16, when the driving assistance ECU 10 determines that the steering control is selected as the assistance control, the driving assistance ECU 10 sets the target steering assist torque (step S22). The setting processing of the target steering assist torque is as described in the description of the steering controller 16. Then, the driving assistance ECU 10 transmits the steering torque command value to the steering ECU 30 such that the avoidance steering control starts from the start timing set in step S14 (step S24). When the deceleration control is in combination with the steering control, the target steering assist torque and the target deceleration may be set in step S22 and the steering torque command value and the braking command may be transmitted in step S24.

Following step S24, the driving assistance ECU 10 determines whether the start timing of the avoidance steering control comes (step S26). The determination processing in step S26 is repeated before a positive determination result is obtained. When the positive result is obtained, that is, when the driving assistance ECU 10 determines that the start timing of the avoidance steering control comes, the driving assistance ECU 10 expands the detection range (step S28). The expansion processing of the detection range is as described in the description of FIG. 5.

Following step S28, the driving assistance ECU 10 determines whether the end timing of the avoidance steering control comes (step S30). That is, the driving assistance ECU 10 determines whether the avoidance steering control is being executed. When the driving assistance ECU 10 determines that the end timing of the avoidance steering control comes, the driving assistance ECU 10 reduces the detection range (step S32). That is, the driving assistance ECU 10 returns the detection range expanded in step S28 to the original range.

In step S30, when the driving assistance ECU 10 determines that the end timing of the avoidance steering control does not come, the driving assistance ECU 10 determines whether the second object is recognized (step S34). The recognition processing of the second object is as described in the description of FIG. 5. When the driving assistance ECU 10 determines that the second object is not recognized, the driving assistance ECU 10 returns to the determination processing in step S30.

In step S34, when the driving assistance ECU 10 determines that the second object is recognized, the driving assistance ECU 10 selects the assistance control (step S36) and sets at least one of the start timing or the end timing of the selected assistance control (step S38). The selection processing of the assistance control and the setting processing such as the start timing of the selected assistance control are as described in the description of FIG. 5.

Following step S38, the driving assistance ECU 10 determines whether the steering control is selected as the assistance control (step S40). When the driving assistance ECU 10 determines that the steering control is not selected as the assistance control, that is, the deceleration control is selected, the driving assistance ECU 10 sets the target deceleration (step S42). The processing in step S42 is the same as the processing in step S18. Then, the driving assistance ECU 10 transmits the braking command to the brake ECU 20 such that the deceleration control starts from the start timing set in step S38 (step S44).

In step S40, when the driving assistance ECU 10 determines that the steering control is selected as the assistance control, the driving assistance ECU 10 determines whether a relative direction (right direction or left direction) of the first object according to current steering control with respect to the host vehicle is the same as the relative direction of the second object recognized in step S34 with respect to the host vehicle (step S46). When the relative directions are opposite to each other, determination can be made that there is a high possibility that the next avoidance steering control is started in a direction opposite to the current avoidance steering control. Therefore, when the driving assistance ECU 10 determines that the relative directions are opposite to each other, the driving assistance ECU 10 proceeds to step S50.

When the relative directions are the same, determination can be made that the next avoidance steering control to cause the host vehicle to avoid in the same direction as the current avoidance steering control is started. Therefore, in step S46, when the driving assistance ECU 10 determines that the relative directions are the same, the driving assistance ECU 10 transmits the cancel command for prohibiting the execution of the return steering control in which the end timing of the currently executed avoidance steering control coincides with the start timing of the next avoidance steering control to the steering ECU 30 (step S48).

Following step S48, the driving assistance ECU 10 sets the target steering assist torque (step S50). The setting processing of the target steering assist torque is as described in the description of FIG. 5. Then, the driving assistance ECU 10 transmits the steering torque command value to the steering ECU 30 (step S52) and returns to step S30. The steering torque command value transmitted in step S52 is the command value for the host vehicle to travel along the connection trajectory from the end timing of the currently executed avoidance steering control and to travel along a return trajectory from a start timing of next return steering control.

With the control device according to Embodiment 1 described above, the following effects can be obtained. That is, when the steering control is selected as the assistance control, the control device expands the detection range during the execution of the avoidance steering control in front of the host vehicle and in the relative direction of the first object with respect to the host vehicle. Therefore, an opportunity to recognize the second object in the same direction as the relative direction of the first object with respect to the host vehicle can be increased.

When the second object is recognized, the control device performs determination relating to a relative direction of the second object. Therefore, it is possible to predict that the next avoidance steering control to cause the host vehicle VC to avoid in the same direction as current avoidance steering control may be started immediately after the end of the current return steering control. When the prediction as described above is made, the control device can prohibit the execution of the current return steering control. Therefore, the vehicle moves in a zigzag manner.

Modification Example of Embodiment 1

When the avoidance directions of the current and next avoidance steering control are turned out to be the same direction, the control device according to Embodiment 1 cancels the end timing of the current return steering control and the start timing of the next avoidance steering control. Further, the control device specifies the connection trajectory to calculate the target steering assist torque. However, the timing described above may not be canceled, and the connection trajectory may not be specified. The modification example as described above will be described with reference to FIGS. 9 to 12.

FIGS. 9(a)-9(d) are diagrams for describing an example of the steering control according to a modification example 1 of Embodiment 1. The autonomous steering by the steering control according to Embodiment 1 is shown in FIGS. 9(a) and 9(b). In Embodiment 1, the execution of the current return steering control and the next avoidance steering control is prohibited, and the target steering assist torque is calculated by separately specifying the connection trajectory. Therefore, in Embodiment 1, the host vehicle VC travels along the connection trajectory from a point $P_1$ (that is, point where the host vehicle VC is predicted to reach at the end timing of the current avoidance steering control) to a point $P_2$ (that is, point where the host vehicle VC is predicted to reach at the start timing of the next return steering control).

The autonomous steering by the steering control according to the modification example 1 is shown in FIGS. 9(c) and 9(i). In modification example 1, the execution of the current return steering control and the next avoidance steering control is not prohibited, and an upper limit value is set to the target steering torque (or change amount thereof) in the current return steering control and the next avoidance steering control to calculate the target steering assist torque. Therefore, lateral acceleration of the host vehicle VC in the current return steering control and the next avoidance steering control becomes smaller than the original lateral acceleration, and the host vehicle VC travels along gentle return trajectory and avoidance trajectory.

Figure 10:
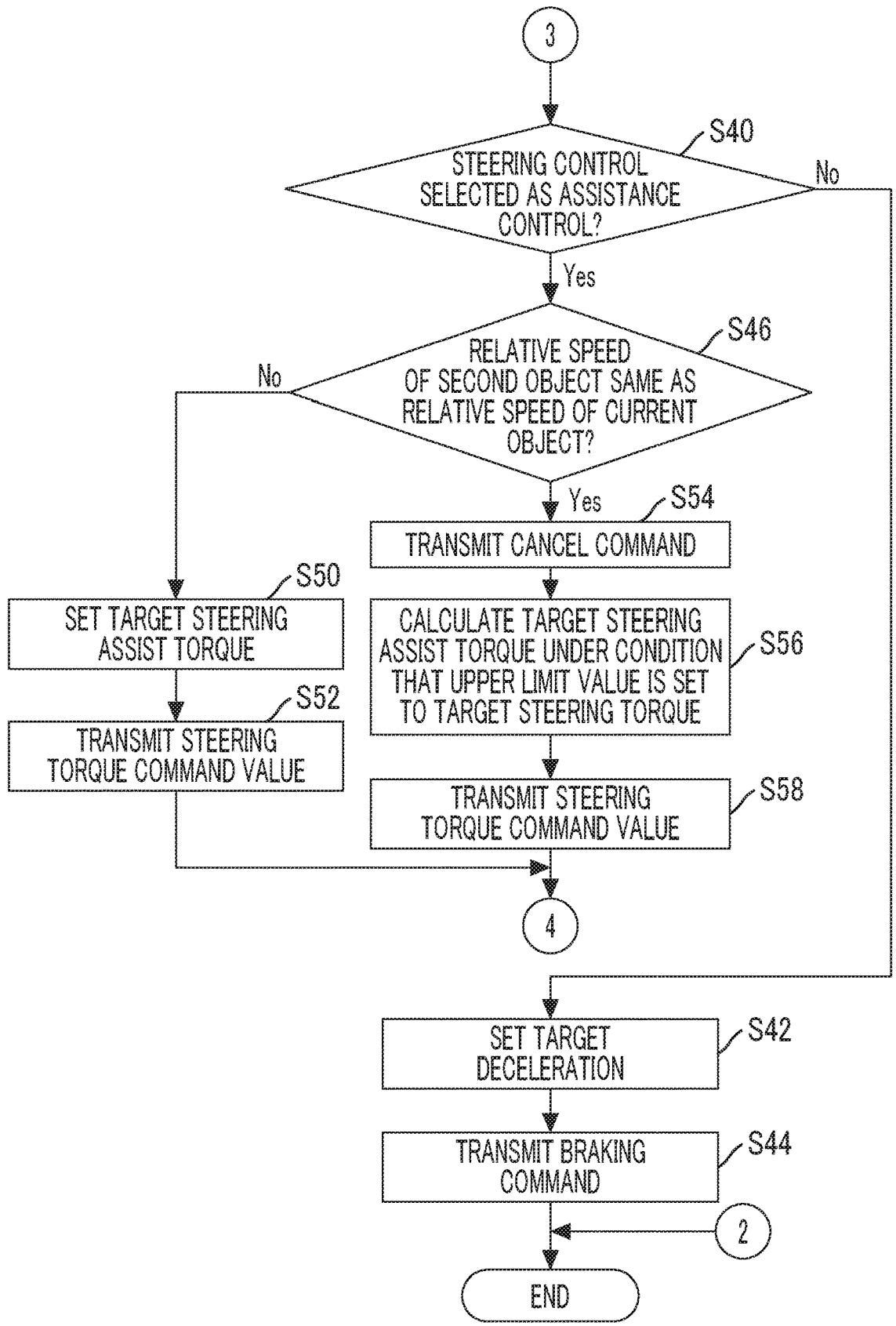
FIG. 10 is a flowchart for describing an example of a processing routine implemented by the driving assistance ECU for realizing the steering control according to the modification example 1 of Embodiment 1 of the disclosure.
Figure 11:
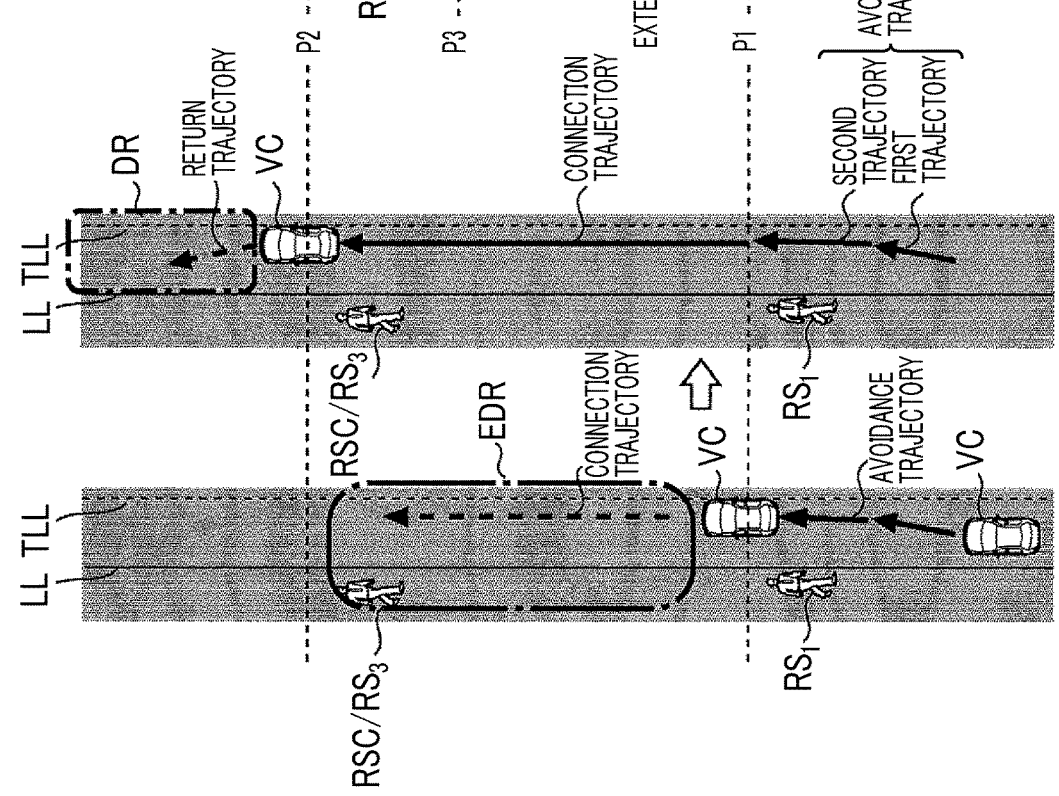
FIGS. 11(a)-11(d) are diagrams for describing steering control according to a modification example 2 of Embodiment 1 of the disclosure.

FIG. 10 is a flowchart for describing an example of a processing routine implemented by the driving assistance ECU 10 for realizing the steering control according to the modification example 1 of Embodiment 1. When the processing routine of FIG. 10 is replaced with the processing routine illustrated in FIG. 8, the assistance control processing routine according to the modification example 1 is described. The processing routine illustrated in FIG. 10 differs from the processing routine illustrated in FIG. 8 in the processing when the positive determination result is obtained in step S46.

That is, when the positive determination result is obtained, the driving assistance ECU 10 transmits the cancel command for prohibiting employment of the target steering assist torque in the current return steering control to the steering ECU 30 (step S54). The driving assistance ECU 10 calculates the target steering assist torque under a condition that an upper limit value TTrmax is set to the target steering torque (step S56). Then, the driving assistance ECU 10 transmits the steering torque command value to the steering ECU 30 (step S58) and returns to step S30. The steering torque command value transmitted in step S58 is the command value for the host vehicle to travel along the gentle trajectories described above from the end timing of the currently executed avoidance steering control and the start timing of the next avoidance steering control, and to travel along the normal return trajectory from the start timing of the next return steering control.

FIGS. 11(a)-(d) are diagrams for describing steering control according to a modification example 2 of Embodiment 1. The autonomous steering by the steering control according to Embodiment 1 is shown in FIGS. 11(a) and 11(b). As described in FIGS. 9(a) and 9(b), in Embodiment 1, the host vehicle VC travels along the connection trajectory from the point $P_1$ to the point $P_2$.

The autonomous steering by the steering control according to the modification example 2 is shown in FIGS. 11(c) and (d). In the modification example 2, only the execution of the current return steering control is prohibited, and the end timing of the current avoidance steering control is extended. Therefore, the point where the host vehicle VC is predicted to reach shifts from the point $P_1$ to the point $P_3$ at the end timing of the current avoidance steering control. Consequently, the host vehicle VC travels along the second trajectory from the point $P_1$ to the point $P_3$ and travels along the avoidance trajectory connected to the second trajectory from the start timing of the next avoidance steering control.

Figure 12:
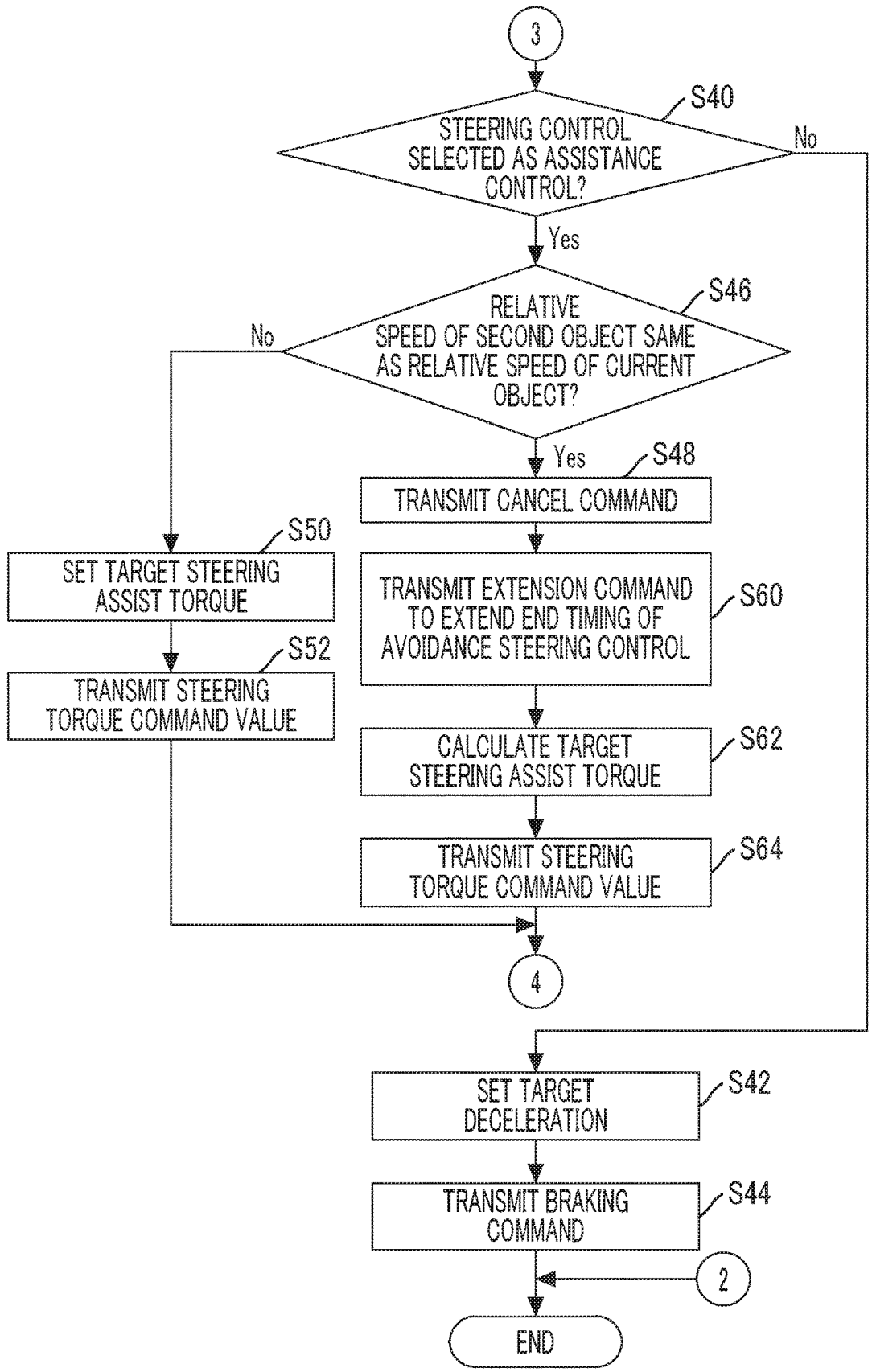
FIG. 12 is a flowchart for describing an example of a processing routine implemented by the driving assistance ECU for realizing steering control according to the modification example 2 of Embodiment 1 of the disclosure.

FIG. 12 is a flowchart for describing an example of a processing routine implemented by the driving assistance ECU 10 for realizing steering control according to a modification example 2 of Embodiment 1. When the processing routine of FIG. 12 is replaced with the processing routine illustrated in FIG. 8, the assistance control processing routine according to the modification example 2 is described. The processing routine illustrated in FIG. 12 differs from the processing routine illustrated in FIG. 8 in the pieces of processing after step S48.

That is, following step S48, the driving assistance ECU 10 transmits an extension command to extend the end timing of the currently executed avoidance steering control to the steering ECU 30 (step S60). An extension period is from the end timing before the change to the start timing of the next avoidance steering control set in step S38. The driving assistance ECU 10 calculates the target steering assist torque (step S62). Then, the driving assistance ECU 10 transmits the steering torque command value to the steering ECU 30 (step S64) and returns to step S30. The steering torque command value transmitted in step S62 is the command value for the host vehicle travels along a current second trajectory until the end timing after the change, travels along the avoidance trajectory connected to the second trajectory from the start timing of the next avoidance steering control, and travels along the normal return trajectory from the start timing of the next return steering control.

The control device according to Embodiment 1 calculates the steering torque (target steering torque, target steering assist torque, and steering torque command value) as a control amount for steering the steering tire-wheel assemblies. However, the control device may calculate a steering angle (target steering angle, target steering assist angle, and steering angle command value) instead of the steering torque. In the case, for example, assuming that a steering angle neutral point is 0°, the steering angle when the steering tire-wheel assemblies are rotated in the right direction from the steering angle neutral point can be represented as a positive value, and the steering angle when the steering tire-wheel assemblies are rotated in the left direction can be represented as a negative value.

As described above, when it is predicted that the direction of avoiding the collision with the second object is the same direction as the avoidance direction of the currently executed avoidance steering control, various modifications can be employed in embodiment 1 as long as control (hereinafter, referred to as "relaxation steering control") which is an intermediate steering control connecting between the currently executed avoidance steering control and the next return steering control and reduces an absolute value of a target value of a steering control amount compared with the current return steering control and the next avoidance steering control is performed. The modification can be similarly employed in Embodiment 2 of the disclosure described next.

Embodiment 2 of will be described with reference to FIGS. 13 to 15. Since a configuration of the control device according to Embodiment 2 is common to the configuration of Embodiment 1, the description of the configuration will be omitted.

Feature of Steering Control According to Embodiment 2

When it is predicted that the direction of avoiding the second object is the same direction as the avoidance direction of the currently executed avoidance steering control, the control device according to Embodiment 1 performs the relaxation steering control that reduces the absolute value of the target steering assist torque than the original value. The steering control according to Embodiment 2 is exceptionally performed during the execution of the relaxation steering control. Hereinafter, for convenience of description, the steering control according to Embodiment 2 is referred to as "exception steering control".

Figure 13:
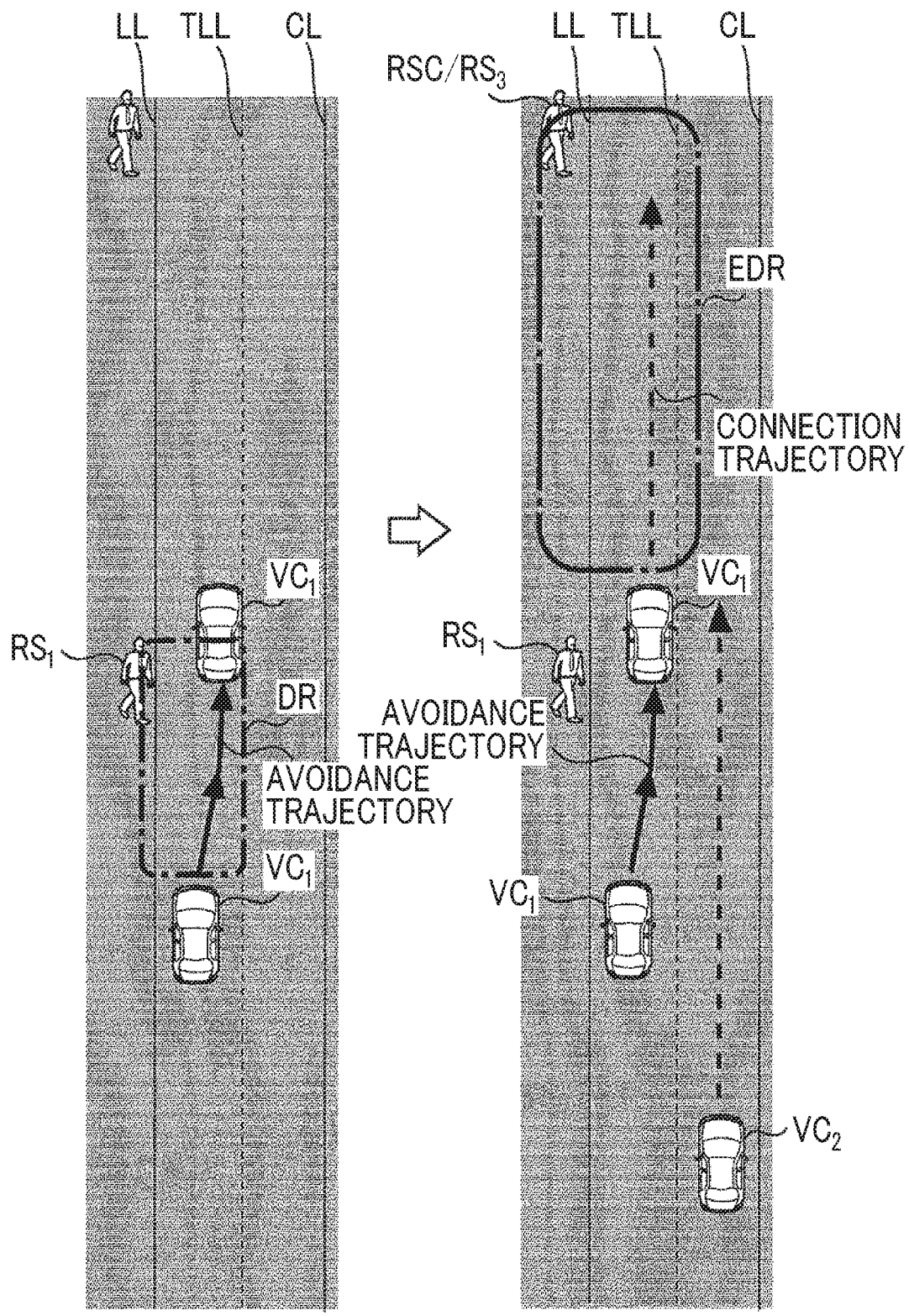
FIG. 13 is a diagram for describing a problem of relaxation steering control according to Embodiment 1 of the disclosure.
Figure 14:
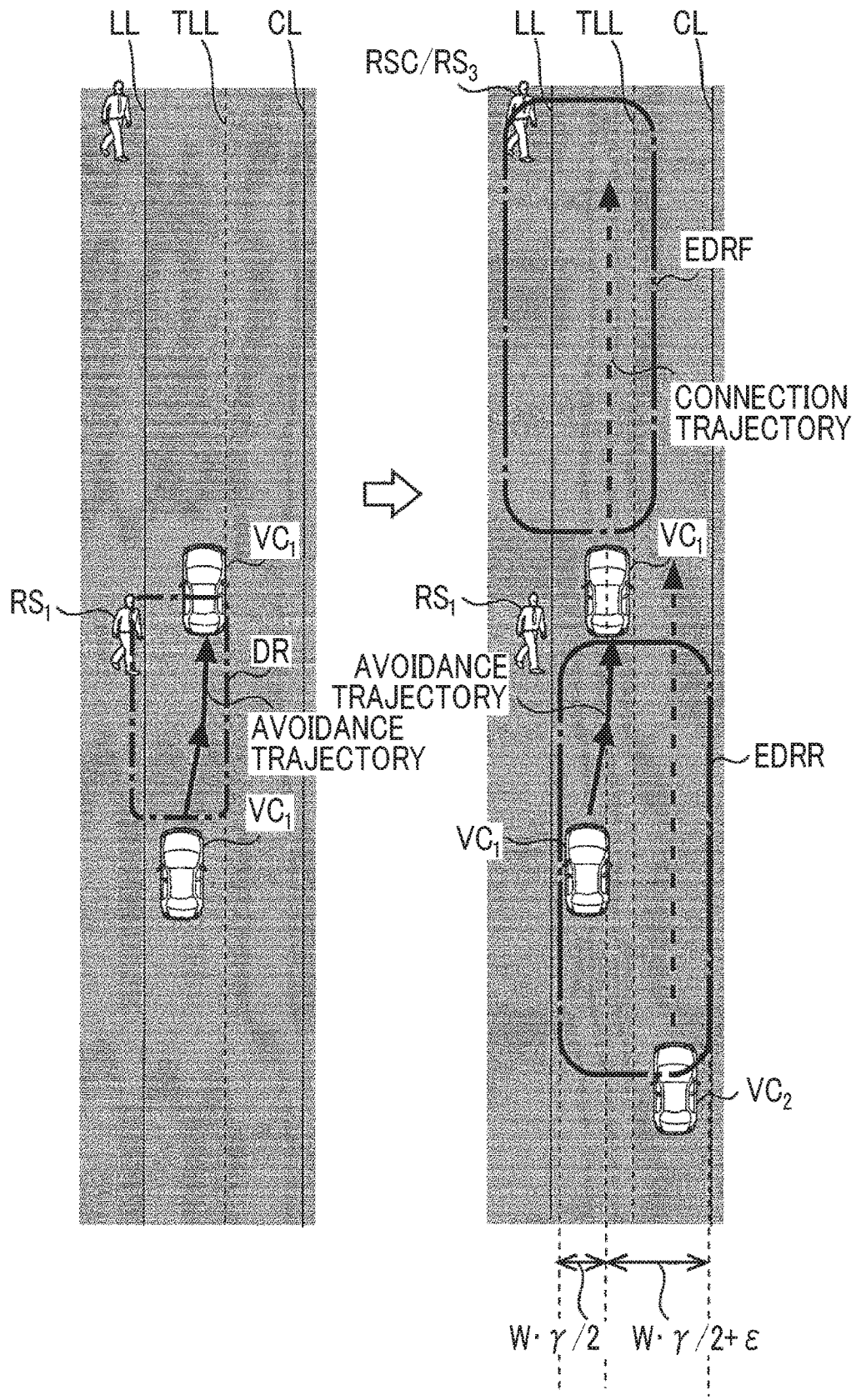
FIG. 14 is a diagram for describing an example of steering control according to Embodiment 2 of the disclosure.

FIG. 13 is a diagram for describing a problem of the relaxation steering control according to Embodiment 1. In the example illustrated in FIG. 13, the relaxation steering control similar to the relaxation steering control described in FIG. 5 is performed. However, in the example illustrated in FIG. 13 unlike FIG. 5, a host vehicle $VC_1$ travels on the traveling lane and a parallel traveling vehicle $VC_2$ travels on the passing lane in two lanes set by the boundary line TLL. The host vehicle VC approaches the boundary line TLL during the execution of the relaxation steering control. Therefore, when the parallel traveling vehicle $VC_2$ travels with maintaining a current traveling state and the parallel traveling vehicle $VC_2$ passes the host vehicle $VC_1$ before the host vehicle $VC_1$ travels by a side of the second object $RS_3$, the driver of the host vehicle $VC_1$ may feel anxiety at the time of the passing.

In Embodiment 2, the detection range set by the detection range setting unit 17 is increased to two positions during the period from the start timing to the end timing of the avoidance steering control. FIG. 14 is a diagram for describing an example of the steering control according to Embodiment 2. In the example illustrated in FIG. 14, the expanded detection ranges are set in front of and behind the host vehicle VC along the current traveling lane. A size of a front detection range EDRF is the same as the size of the detection range EDR described in FIG. 5. The rear detection range EDRR is obtained by rotating the detection range EDRF by 180 degrees with the center of the host vehicle $VC_1$ as the rotation center. A size of the detection range EDRR is the same as the size of the detection range EDRF. The detection range EDR, the detection range EDRF are the examples of a first detection range. The detection range EDRR is a example of a second detection range.

In Embodiment 2, the assistance control determination unit 14 performs determination relating to a possibility of continuing the relaxation steering control (hereinafter, referred to as "continuity possibility") during the execution of the avoidance steering control. The assistance control determination unit 14 calculates a catch-up timing when the parallel traveling vehicle $VC_2$ catches up with the host vehicle $VC_1$ based on a distance $L_3$ between the host vehicle $VC_1$ and the parallel traveling vehicle $VC_2$, and a relative speed $Vr_3$ with the parallel traveling vehicle $VC_2$. The assistance control determination unit 14 calculates an inter-vehicle distance when the parallel traveling vehicle $VC_2$ approaches closest to the host vehicle $VC_1$ during the execution of the relaxation steering control based on a trajectory of the parallel traveling vehicle $VC_2$ and a connection trajectory.

Then, the assistance control determination unit 14 determines whether the parallel traveling vehicle $VC_2$ catches up with the host vehicle $VC_1$ during the execution of the relaxation steering control based on the catch-up timing. The assistance control determination unit 14 compares the inter-vehicle distance with a determination value LTH. The host vehicle $VC_1$ and the parallel traveling vehicle $VC_2$ travel each traveling lane, and the parallel traveling vehicle $VC_2$ is not assumed to interfere with the host vehicle $VC_1$. Accordingly, the determination value LTH is set to a value having a relatively large margin. When the assistance control determination unit 14 determines that the parallel traveling vehicle $VC_2$ catches up with the host vehicle $VC_1$ during the execution of the relaxation steering control and the inter-vehicle distance is shorter than the determination value LTH, the assistance control determination unit 14 determines that the continuity possibility is high. When the continuity possibility is determined to be high, the assistance control determination unit 14 does not perform any special processing. Therefore, at the same time when the avoidance steering control ends at an already set end timing, the return steering control is started.

Specific Processing in Embodiment 2

Figure 15:
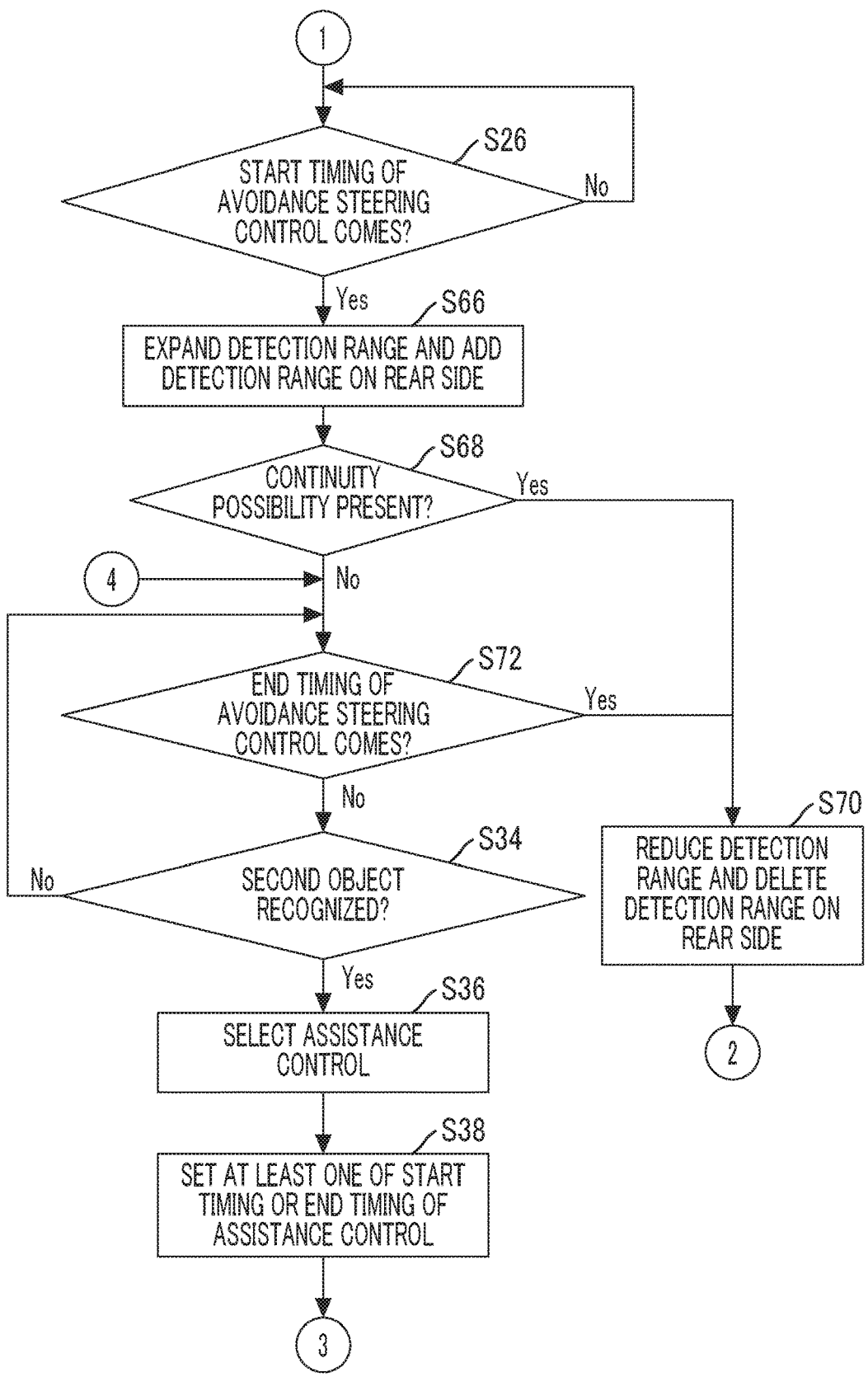
FIG. 15 is a flowchart for describing an example of a processing routine implemented by the driving assistance ECU for realizing exception steering control according to Embodiment 2 of the disclosure.

FIG. 15 is a flowchart for describing an example of a processing routine implemented by the driving assistance ECU 10 for realizing the exception steering control according to Embodiment 2. When the processing routine of FIG. 15 is replaced with the processing routine illustrated in FIG. 7, the assistance control processing routine according to Embodiment 2 is described. The processing routine illustrated in FIG. 15 differs from the processing routine illustrated in FIG. 7 in that the pieces of processing from step S26 to step S34 are added.

That is, in step S26, when the driving assistance ECU 10 determines that the start timing of the avoidance steering control comes, the driving assistance ECU 10 expands the detection range and adds the detection range behind the host vehicle (step S66). The expansion processing and add processing of the detection range are as described in the description of FIG. 14.

Following step S66, the driving assistance ECU 10 determines presence or absence of the continuity possibility (step S68). The determination processing relating to the continuity possibility is as described in the description of FIG. 14. When the continuity possibility is determined to be present, the driving assistance ECU 10 reduces the detection range in front of the host vehicle and deletes the detection range behind the host vehicle (step S70). That is, the driving assistance ECU 10 returns the detection range expanded in step S68 to the original range.

In step S70, when the continuity possibility is determined to be absent, the driving assistance ECU 10 determines whether the end timing of the avoidance steering control comes (step S72). The processing in step S72 is the same as the processing in step S30 of FIG. 7. When the driving assistance ECU 10 determines that the end timing of the avoidance steering control comes, the driving assistance ECU 10 proceeds to step S70. When the driving assistance ECU 10 determines that the end timing of the avoidance steering control does not come, the driving assistance ECU 10 proceeds to step S34. The pieces of processing after step S34 is as described in FIG. 7.

With the control device according to Embodiment 2 described above, the following effects can be obtained. That is, when the steering control is selected as the assistance control, the control device not only expands the detection range during the execution of the avoidance steering control but also sets the detection range having the same size as the expanded detection range behind the host vehicle. Accordingly, appropriateness of the relaxation steering control can be determined based on the continuity possibility.

What is claimed is:

1. A control device for a vehicle including steered wheels, the control device comprising
an electronic control unit configured to:
execute first steering control to avoid a collision with a first object that has a collision determination value greater than a predetermined value;
execute second steering control following the first steering control, the second steering control being control to steer the steered wheels in a direction opposite to a steering direction of the steered wheels by the first steering control;
set an avoidance target value and a return target value when the first object is detected in a first detection range, the avoidance target value being a target value of a control amount for steering the steered wheels in the first steering control, and the return target value being a target value of a control amount for steering the steered wheels in the second steering control;
expand the first detection range at least in front of the host vehicle during execution of current first steering control utilizing the avoidance target value;
when a second object is detected in the expanded first detection range during the execution of the current first steering control, determine whether a next first steering control to avoid a collision with the second object that has a collision determination value greater than a predetermined value is needed to be implemented and whether a relative direction of the second object with respect to the host vehicle is the same as a relative direction of the first object with respect to the host vehicle; and
perform relaxation steering control based on a target value smaller in absolute value than the return target value instead of current second steering control utilizing the return target value after an end of the current first steering control when the implementation of the next first steering control is determined to be needed and the relative directions with respect to the host vehicle are determined to be the same between the second object and the first object.

2. The control device for a vehicle according to claim 1, wherein the electronic control unit is configured to perform the relaxation steering control before next second steering control following the next first steering control is started.

3. The control device for a vehicle according to claim 1, wherein:
the electronic control unit is configured to set the first detection range in front of the host vehicle;
the electronic control unit is configured to set a second detection range behind the host vehicle at a position obtained by rotating the first detection range by 180 degrees around a center of the host vehicle during the execution of the first steering control such that the electronic control unit detects a parallel traveling vehicle that travels behind the host vehicle in a lane adjacent to a lane in which the host vehicle travels;
the electronic control unit is configured to determine whether the parallel traveling vehicle approaches the host vehicle during the execution of the relaxation steering control and whether an inter-vehicle distance between the host vehicle and the parallel traveling vehicle is shorter than a determination value when the parallel traveling vehicle is detected in the second detection range during the execution of the current first steering control; and
the electronic control unit is configured to perform the current second steering control after the end of the current first steering control when the parallel traveling vehicle is determined to approach the host vehicle during the execution of the relaxation steering control and the inter-vehicle distance between the host vehicle and the parallel traveling vehicle is determined to be shorter than the determination value.

4. The control device for a vehicle according to claim 1, wherein:
the electronic control unit is configured to, during the execution of the current first steering control, expand the first detection range in a direction in front of the host vehicle and in a direction opposite to a movement direction of the host vehicle in a right and left direction of the host vehicle in the current first steering control; and
an expansion width of the first detection range in the right and left direction is equal to or larger than a movement distance of the host vehicle in the right and left direction in the current first steering control.

5. The control device for a vehicle according to claim 1, wherein:
the vehicle includes an external sensor; and the electronic control unit is configured to detect the first object and the second object in the first detection range utilizing information acquired by the external sensor.

6. A control method of a vehicle including steered wheels and an electronic control unit, the control method comprising:

executing, by the electronic control unit, first steering control to avoid a collision with a first object that has a collision determination value greater than a predetermined value;

executing, by the electronic control unit, second steering control following the first steering control, the second steering control being control to steer the steered wheels in a direction opposite to a steering direction of the steered wheels by the first steering control;

setting, by the electronic control unit, an avoidance target value and a return target value when the first object is detected in a first detection range, the avoidance target value being a target value of a control amount for steering the steered wheels in the first steering control, and the return target value being a target value of a control amount for steering the steered wheels in the second steering control;

expanding, by the electronic control unit, the first detection range at least in front of the host vehicle during execution of a current first steering control utilizing the avoidance target value;

when a second object is detected in the expanded first detection range during the execution of the current first steering control, determining, by the electronic control unit, whether a next first steering control to avoid a collision with the second object that has a collection determination value greater than a predetermined value is needed to be implemented and whether a relative direction of the second object with respect to the host vehicle is the same as a relative direction of the first object with respect to the host vehicle; and performing, by the electronic control unit, a relaxation steering control utilizing a target value smaller in absolute value than the return target value instead of a current second steering control based on the return target value after an end of the current first steering control when the implementation of the next first steering control is determined to be needed and the relative directions with respect to the host vehicle are determined to be the same between the second object and the first object.

* * * * *